United States Patent
Hamada et al.

(10) Patent No.: US 11,281,645 B2
(45) Date of Patent: Mar. 22, 2022

(54) DATA MANAGEMENT SYSTEM, DATA MANAGEMENT METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventors: Shinichiro Hamada, Fuchu Tokyo (JP); Soichiro Ono, Kawasaki Kanagawa (JP); Mayumi Yuasa, Ota Tokyo (JP); Kunio Osada, Fuchu Tokyo (JP)

(73) Assignees: KABUSHIKI KAISHA TOSHIBA, Tokyo (JP); TOSHIBA DIGITAL SOLUTIONS CORPORATION, Kawasaki (JP)

(*) Notice: Subject to any disclaimer, the term of this patent is extended or adjusted under 35 U.S.C. 154(b) by 399 days.

(21) Appl. No.: 15/927,124

(22) Filed: Mar. 21, 2018

(65) Prior Publication Data
US 2018/0210907 A1 Jul. 26, 2018

Related U.S. Application Data

(63) Continuation of application No. PCT/JP2015/080446, filed on Oct. 28, 2015.

(51) Int. Cl.
*G06F 16/20* (2019.01)
*G06F 16/30* (2019.01)
(Continued)

(52) U.S. Cl.
CPC ........ *G06F 16/2237* (2019.01); *G06F 16/221* (2019.01); *G06F 16/2246* (2019.01);
(Continued)

(58) Field of Classification Search
CPC .............. G06F 16/2237; G06F 16/221; G06F 16/2246; G06F 16/3347; G06F 16/2255
(Continued)

(56) References Cited

U.S. PATENT DOCUMENTS

| 6,438,268 | B1* | 8/2002 | Cockshott ............... G06T 9/008 |
| | | | 375/E7.209 |
| 2010/0027895 | A1 | 2/2010 | Noguchi et al. |

(Continued)

FOREIGN PATENT DOCUMENTS

| JP | 2000-035965 | 2/2000 |
| JP | 2001-052024 | 2/2001 |

(Continued)

OTHER PUBLICATIONS

International Search Report and Written Opinion for International Patent Application No. PCT/JP2015/080446 dated Nov. 24, 2015, 8 pages.

(Continued)

*Primary Examiner* — Kristopher Andersen
(74) *Attorney, Agent, or Firm* — Amin, Turocy & Watson, LLP

(57) ABSTRACT

According to an embodiment, a data management system includes an index building unit and a searching unit. The index building unit generates a peripheral vector similar to a case example vector representing a feature vector of data to be stored, and builds index information of enabling identification of the case example vector corresponding to the generated peripheral vector. The searching unit refers to the index information in response to a search request in which a query vector representing an arbitrary feature vector is specified, identifies the case example vector corresponding to the peripheral vector that exactly matches with the (Continued)

query vector, and outputs a search result based on the identified case example vector.

16 Claims, 25 Drawing Sheets

(51) Int. Cl.
*G06F 16/22* (2019.01)
*G06F 16/33* (2019.01)
*G06F 16/23* (2019.01)
(52) U.S. Cl.
CPC ...... *G06F 16/2255* (2019.01); *G06F 16/3347* (2019.01); *G06F 16/23* (2019.01)
(58) Field of Classification Search
USPC .......................................................... 707/741
See application file for complete search history.

(56) References Cited

U.S. PATENT DOCUMENTS

| | | | |
|---|---|---|---|
| 2015/0154192 A1* | 6/2015 | Lysne | G06F 17/16 707/748 |
| 2015/0363470 A1* | 12/2015 | Bestgen | G06F 16/24578 707/723 |

FOREIGN PATENT DOCUMENTS

| | | |
|---|---|---|
| WO | 2008/026414 | 3/2008 |
| WO | 2013/129580 | 9/2013 |

OTHER PUBLICATIONS

Shrivastava, et al. "Asymmetic LSH (ALSH) for Sublinear Time Maximum Inner Product Search (MIPS)", Advances in Neural Information Processing Systems, 2014.

Charikar "Similarity Estimation Techniques from Rounding Algorithms", Proceedings of the 34th Annual ACM Symposium on Theory of Computing, pp. 380-388, doi : 10, 1145/509908, 509965.

Weiss, et al. "Spectral Hashing", Advances in Neural Information Processing Systems, 2009.

Jegou, et al. "Product quantization for nearest neighbor search", Pattern Analysis and Machine Intelligence, IEEE Transactions on 33.1 (2011) : 117-128.

Babenko, et al. "The Inverted Multi-Index", 2012 IEEE Conference on Computer Vision and Pattern Recognition, pp. 3069-3076.

* cited by examiner

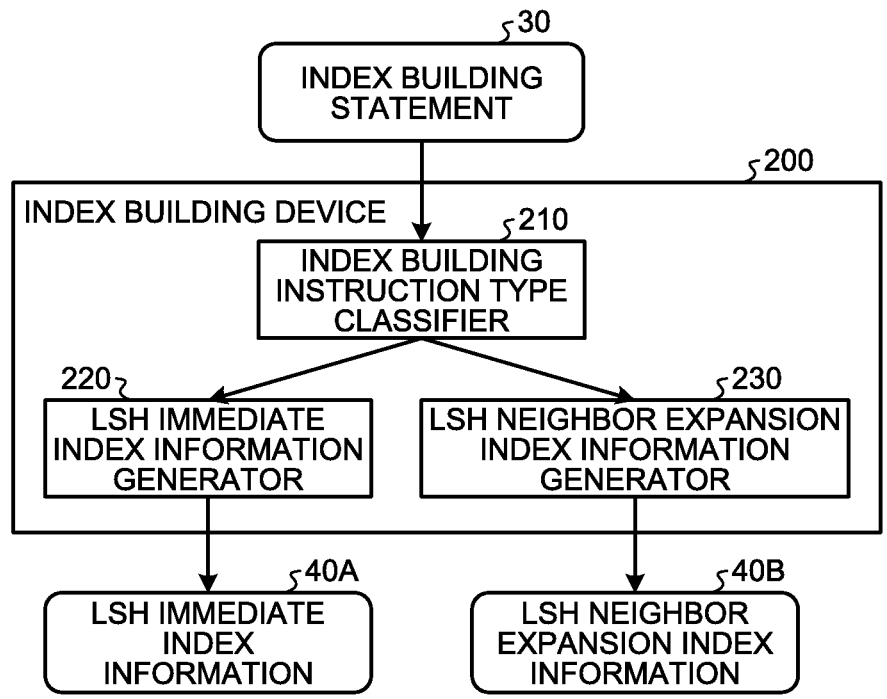

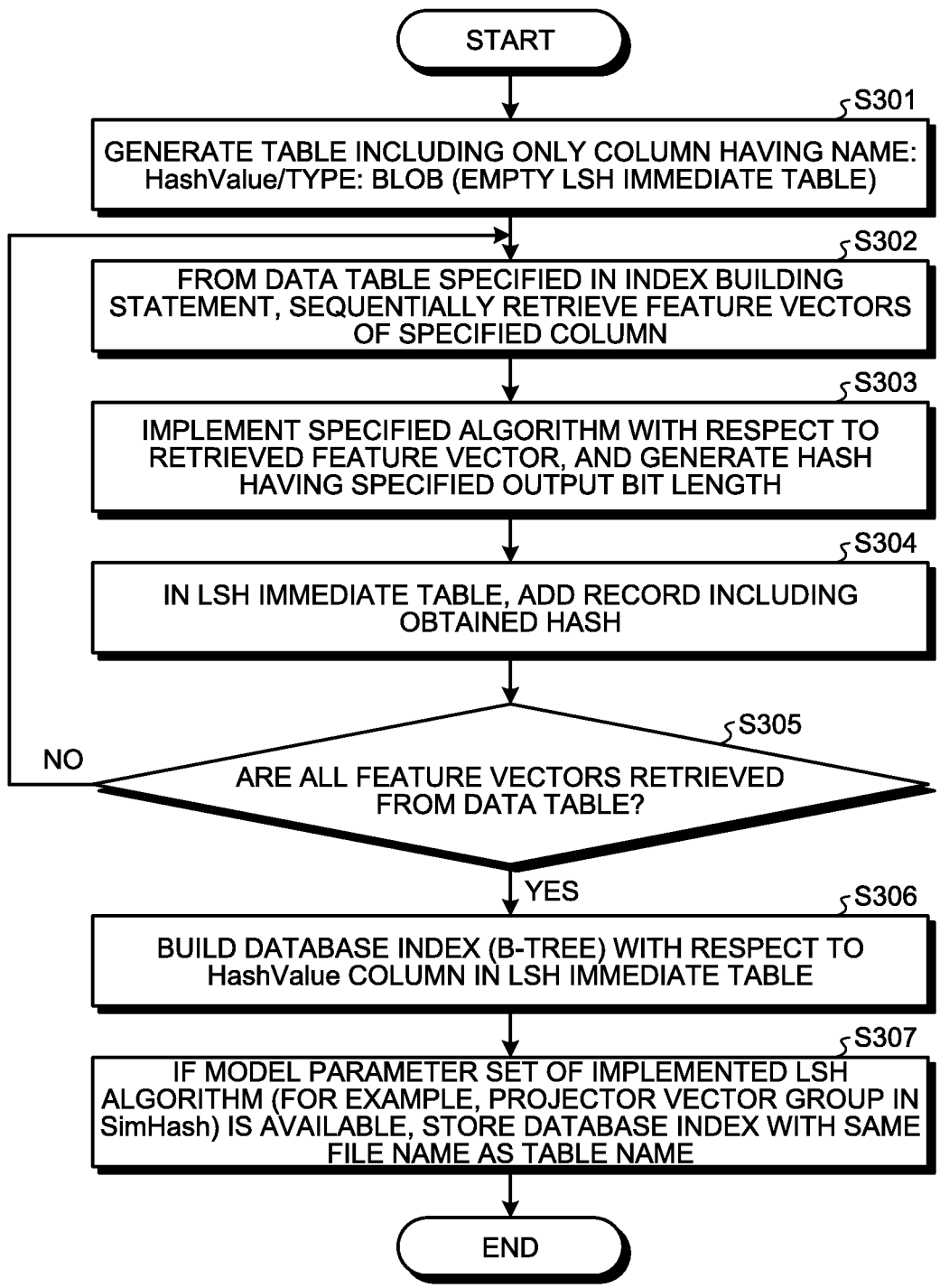

FIG.8

| HashValue | HammingDistance | DataRowID |
|---|---|---|
| 100 | 0 | 1 |
| 000 | 1 | 1 |
| 110 | 1 | 1 |
| 101 | 1 | 1 |
| 010 | 0 | 2 |
| 110 | 1 | 2 |
| 000 | 1 | 2 |
| 011 | 1 | 2 |
| 000 | 0 | 3 |
| 100 | 1 | 3 |
| 010 | 1 | 3 |
| 001 | 1 | 3 |
| 001 | 0 | 4 |
| 101 | 1 | 4 |
| 011 | 1 | 4 |
| 000 | 1 | 4 |
| 011 | 0 | 5 |
| 111 | 1 | 5 |
| 001 | 1 | 5 |
| 010 | 1 | 5 |
| ⋮ | ⋮ | ⋮ |

FIG.9A

| HashValue | HammingDistance |
|---|---|
| 000 | 0 |
| 000 | 1 |
| 001 | 0 |
| 001 | 1 |
| 010 | 0 |
| 010 | 1 |
| 011 | 0 |
| 011 | 1 |
| 100 | 0 |
| 100 | 1 |
| 101 | 0 |
| 101 | 1 |
| 110 | 0 |
| 110 | 1 |
| 111 | 0 |
| 111 | 1 |
| ⋮ | ⋮ |

FIG.9B

| Table1_RowID | DataRowID |
|---|---|
| 1 | 3 |
| 2 | 1 |
| 2 | 2 |
| 2 | 4 |
| 3 | 4 |
| 4 | 3 |
| 4 | 5 |
| 5 | 2 |
| 6 | 3 |
| 6 | 5 |
| 7 | 5 |
| 8 | 2 |
| 8 | 4 |
| 9 | 1 |
| 10 | 3 |
| 12 | 1 |
| 12 | 4 |
| 14 | 1 |
| 14 | 2 |
| 16 | 5 |
| ⋮ | ⋮ |

| HashValue | Distance | DataRowID |
|---|---|---|
| 10 | 0 | 1 |
| 00 | 0.4 | 1 |
| 20 | 0.4 | 1 |
| 11 | 1 | 1 |
| 20 | 0 | 2 |
| 10 | 0.4 | 2 |
| 00 | 0.8 | 2 |
| 21 | 1 | 2 |
| ⋮ | ⋮ | ⋮ |

DATA MANAGEMENT SYSTEM, DATA MANAGEMENT METHOD, AND COMPUTER PROGRAM PRODUCT

CROSS-REFERENCE TO RELATED APPLICATIONS

This application is a continuation of PCT international application Ser. No. PCT/JP2015/080446 filed on Oct. 28, 2015, which designates the United States, incorporated herein by reference, the entire contents of which are incorporated herein by reference.

FIELD

Embodiments described herein relate generally to a data management system, a data management method, and a computer program product.

BACKGROUND

In recent years, with the advancement in the information communication technology, it has become possible to collect and store a large variety of data; and information processing technology aiming at large-scale data, such as big data analysis and big media analysis, is gaining attention. In a system in which such large-scale data is handled, the amount of calculations that gets bloated with the accelerated expansion of the data scale leads to service degradation. Hence, the critical issue is how to reduce the amount of calculations.

In data retrieval such as database retrieval, as a method for enabling quick media retrieval of images and music, a similarity search is performed using multidimensional feature vectors. During the similarity search, the amount of calculations consists mostly of a vector neighbor search including calculation of a similarity degree between future vectors, that is, the operation of finding, from a group of feature vectors to be searched (hereinafter, called "case example vectors"), a group of feature vectors close to a particular feature vector (hereinafter, called a "query vector"). Hence, there is a demand for reducing the amount of calculations during the vector neighbor search and shortening the execution period of data retrieval.

BRIEF DESCRIPTION OF THE DRAWINGS

FIG. 5 is a block diagram illustrating an exemplary configuration of an index building device;

FIG. 6 is a diagram illustrating an example of a locality-sensitive hashing (LSH) immediate table;

FIG. 7 is a flowchart for explaining an exemplary sequence of operations performed by an LSH immediate index information generator;

FIG. 8 is a diagram illustrating an example of an LSH neighbor expansion table;

FIGS. 9A and 9B are diagrams illustrating an example in which the LSH neighbor expansion table is normalized by dividing it into two tables;

DETAILED DESCRIPTION

Figures 1, 2:
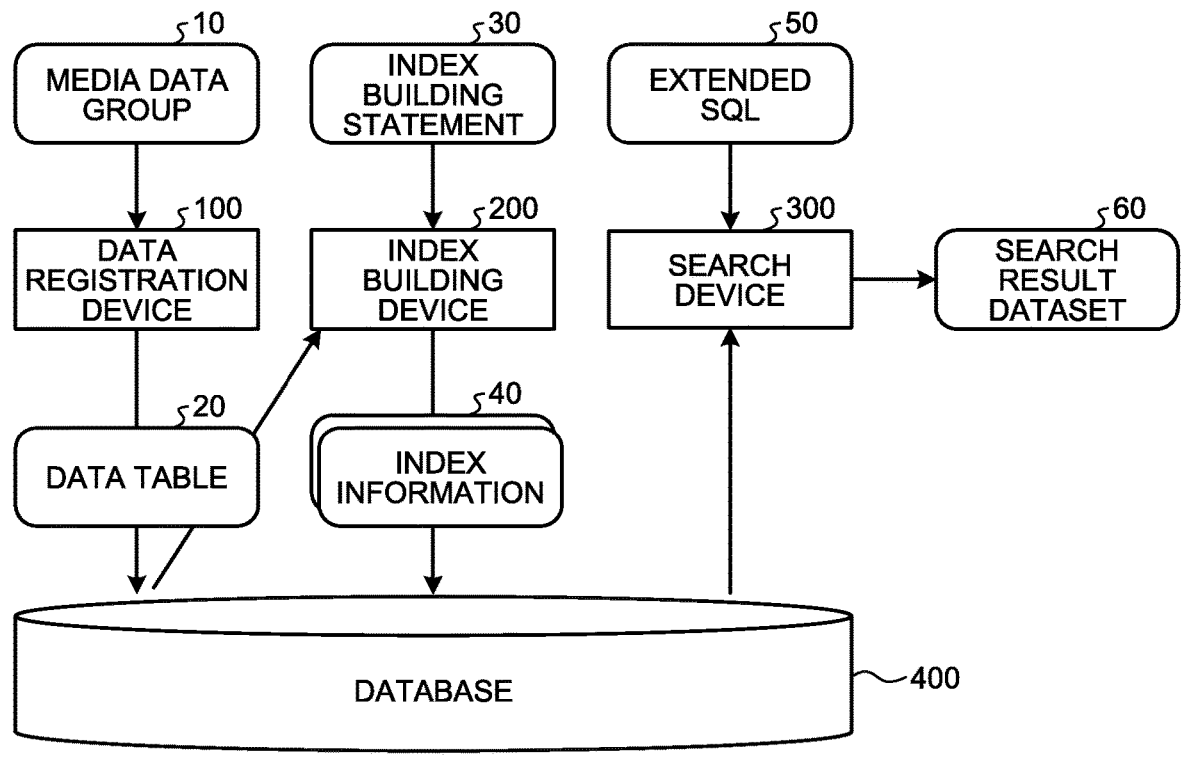
FIG. 1 is a system configuration diagram illustrating an overview of a data management system according to a first embodiment.
FIG. 2 is a diagram illustrating a specific example of a data table.

According to an embodiment, a data management system includes an index building unit and a searching unit. The index building unit generates a peripheral vector similar to a case example vector representing a feature vector of data to be stored, and builds index information of enabling identification of the case example vector corresponding to the generated peripheral vector. The searching unit refers to the index information in response to a search request in which a query vector representing an arbitrary feature vector is specified, identifies the case example vector corresponding to the peripheral vector that exactly matches with the query vector, and outputs a search result based on the identified case example vector.

Exemplary embodiments of a data management system, a data management method, and a computer program product are described below in detail with reference to the accompanying drawings.

The data management system according to the embodiments is a system for enabling efficient management/retrieval of large-scale data. In a conventional system for managing large-scale data as handled in the database management system; generally, a data placement mechanism for optimizing disk accesses is installed as the lower level, and an indexing mechanism for enabling high-speed retrieval of the large-scale data based on search conditions is installed as the upper level. In the indexing algorithm, a tree structure algorithm such as a B-tree and a commonly-used hash algorithm are mainly implemented.

The search conditions usable in a database are often logical expressions made of four arithmetic operations/set operations related to the basic types such as real numbers/integers/character strings/dates (hereinafter, collectively referred to as the "DB basic types"). Regarding vectors or bit strings (that is, binary vectors), the similarity therebetween cannot be usually used as a search condition except for a few exceptional situations. The underlying reason for that is indexing for achieving efficiency in the search conditions including similarity degree calculation of vectors has not been put forth.

The few exceptional situations mentioned above include similarity degree calculation aiming at low-dimensional vectors. In many well-known database management systems, the application of managing time-space data is mainly envisioned, and thus similarity degree calculation for low-dimensional vectors having about two to four dimensions is allowed to be included in the search conditions. In order to implement such similarity degree calculation, an indexing method called a space tree (a space division method) is used, and accordingly it becomes possible to perform high-speed retrieval. However, when the vectors are not low-dimensional vectors, the expansion of the index size causes a loss in the speed, and the execution period is known to become equal to the execution period of the usual linear search. In the embodiments, the feature vectors are high-dimensional vectors having dimensions in the range of few hundreds of dimensions to hundreds of millions of dimensions assumed to be used in, for example, a machine learning application. Hence, even if a method based on the space tree is used, it is not possible to achieve high-speed retrieval.

However, it is possible to perform high-speed collation of the exact match of high-dimensional vectors. That case is equivalent to performing a search under a condition formed by concatenating, with logical AND, equality conditions with respect to the elements at each dimension of two vectors. That is, this search condition is made of only scalar operations, and the similarity degree calculation of vectors is not involved. Hence, an index such as a B-tree index can be used.

As described above, in a conventional and commonly-used database management system, although high-speed retrieval of large-scale data can be performed under the search conditions configured with the DB basic types, the vector neighbor search involving similarity calculation among non-low-dimensional vectors cannot be performed at high speeds. In that regard, in the embodiments described below, a new database management system is proposed in which the amount of calculations for the vector neighbor search is reduced so as to enable the vector neighbor search at high speeds and to enable shortening of the execution period of data retrieval.

Meanwhile, the inner product and the distance are used as indicators of the degree of similarity between vectors. The inner product calculation for obtaining the inner product value between vectors and the distance calculation for obtaining the distance between vectors are almost identical in terms of the meaning as well as in terms of the amount of calculations. When two vectors are similar, the inner product value increases but the distance decreases. Thus, a greater inner product value between the vectors as well as a shorter distance between the vectors implies a high degree of similarity between the vectors. In the following explanation, the degree of similarity between the vectors is expressed using the distance. However, the distance can be substituted with the inner product. In this case, the smaller the distance between vectors, that is, the higher the degree of similarity between vectors; it can be thought that the greater becomes the inner product value.

As a method of reducing the amount of calculations in a vector neighbor search, it is possible to think of using the locality-sensitive hashing (LSH). The LSH is a technology for mapping the provided group of vectors onto a contracted vector space that takes only discrete values (for example, see Reference Literature 1 mentioned below). The LSH-based mapping has the property that the relative magnitude of the distance between vectors in the pre-mapping space is sufficiently retained in the post-mapping space too. Thus, instead of calculating the inter-vector distance in the pre-mapping vector space, if the inter-vector distance in the post-mapping vector space is calculated, it becomes possible to achieve efficiency in the calculations. However, since the magnitude relationship of the distances is not completely retained, what is obtained is an approximate solution.

Patent Literature 1: Japanese Patent Application Laid-open No. 2000-35965

Patent Literature 2: Japanese Patent Application Laid-open No. 2001-52024

Reference Literature 1: Anshumali Shrivastava and Ping Li, "Asymmetric LSH (ALSH) for Sublinear Time Maximum Inner Product Search (MIPS)", Advances in Neural Information Processing Systems, 2014.

As far as the LSH algorithm is concerned, for example, various algorithms such as the SimHash (Random projection) in Reference Literature 2 mentioned below or Spectral Hashing in Reference Literature 3 mentioned below have been proposed in the past.

Reference Literature 2: Moses S. Charikar, "Similarity Estimation Techniques from Rounding Algorithms", Proceedings of the 34th Annual ACM Symposium on Theory of Computing, pp. 380?388, doi: 10, 1145/509907, 509965.

Reference Literature 3: Yair Weiss, Antonio Torralba and Rob Fergus, "Spectral Hashing", Advances in neural information processing systems, 2009.

The LSH algorithm can be broadly divided into a bitwise method and a product quantization method. In the algorithm of the bitwise method, a binary vector is output as the mapping result for the provided vector. On the other hand, in the algorithm of the product quantization method, an integer vector (a multivalued vector made of only integer elements) is output as the mapping result for the provided vector. Moreover, in the algorithm of the product quantization method, for each dimension of a vector, information equivalent to the weight with respect to the distance (i.e., the amount of variation in the distance of the vector with respect to the variation in each dimension) is also generated.

As described above, as a result of using the vectors obtained by the LSH-based mapping, it becomes possible to achieve efficiency in the calculation of the inter-vector distances. Particularly, in the case of binary vectors, a bit operation instruction such as xor or a dedicated CPU instruction such as popcount can be used in the distance calculation operation. That enables achieving significant reduction in the amount of calculations.

However, even if the LSH is implemented, it is not possible to avoid the actual calculation of the inter-vector distances. In a conventional database management system, as described above, since no workable indexing algorithm has been put forth with respect to the search operations accompanying the distance calculation of non-low-dimensional vectors, the linear search needs to be performed and the order of the amount of calculations cannot be set to be sublinear. As a result, when the case example vectors to be searched are large in number such as one hundred million, it becomes necessary to have a long search period. In that regard, a new data management system is proposed in which an indexing algorithm is implemented that is workable with respect to the search operations involving the distance calculation of non-low-dimensional vectors.

Given below is the explanation of the fundamental principle of the embodiments. In the data management system according to the embodiments, firstly, preprocessing is performed in the following manner: regarding each case example vector, similar vectors to the case example vector are generated, that is, a group of vectors having the distance to the case example vector to be equal to or shorter than a predetermined value (hereinafter, called "peripheral vectors") is generated; index information is built for enabling identification of the case example vector from the peripheral vectors; and data containing the case example vector is stored in a database along with the index information. Then, at the time of performing a search, based on the index information, such a case example vector is identified which corresponds to the peripheral vector exactly matching with the query vector; and the search result with respect to the search request is output based on the identified case example vector.

In order to rationally generate the peripheral vectors that are similar to a case example vector during preprocessing, the number of dimensions of the vectors under consideration as well as the cardinality of each element value set needs to be small. Unless such conditions are satisfied, the number of peripheral vectors explodes and the search period cannot be shortened as a result. In order to achieve the conditions, the abovementioned LSH is used. The vector elements generated using the LSH take binary values in the case of the bitwise method and take multivalued discrete values in the case of the product quantization method. Although dependent on the LSH settings, it is often the case that discrete vectors (contracted vectors) having a small cardinality of the element value set and a small number of dimensions are generated. Thus, before implementing the method described above as the fundamental principle, the group of case example vectors and the query vector can be converted into contracted vectors using the LSH, and the search can be performed using the contracted vectors and according to the method described above as the fundamental principle. However, as a result of using the LSH, the search result represents an approximate solution.

Meanwhile, if the case example vector group or the query vector originally satisfies the abovementioned conditions, then LSH-based vector conversion need not be performed in advance, and only the method described above as the fundamental principle can be implemented.

In the method described above as the fundamental principle, peripheral vectors having the distance to the case example vector to be equal to or shorter than a predetermined value are generated. However, alternatively, the configuration can be such that peripheral vectors having the distance to the query vector to be equal to or shorter than a predetermined value are generated. In that case, at the time of performing a search, peripheral vectors having the distance to the query vector to be equal to or shorter than a predetermined value are generated; case example vectors exactly matching with the peripheral vectors are identified; and the search result with respect to the search request is output based on the identified case example vectors.

Given below is the specific explanation of an example of application in a data management system in which a media search is performed by processing a query having inter-vector distance calculation as a search condition. As an application subject of the media search, a search of face images (including videos) is taken up. In a face image search, from a media group of images/videos registered in advance in the system, such images/videos are found which include the face similar to a face included in the image/video provided as a query. Meanwhile, although a face image search is taken up as the application subject, the data management system according to the embodiments is applicable to various types of media searches and sensor data searches such as a music search, an object image search, a scene image search, a text meaning search, a sensor pattern search, an equity price pattern search, and an electricity usage pattern search.

First Embodiment

Firstly, the explanation is given about the data management system according to a first embodiment. In the first embodiment, it is assumed that the bitwise LSH is implemented in the mapping operation, and that the Hamming distance is used as the distance between post-mapping binary vectors (hashes). However, as described earlier, if the case example vectors to be handled and the query vector are originally low-dimensional binary vectors, then mapping based on the bitwise LSH need not be performed; and the case example vectors can be used without modification as case example hashes (contracted case example vectors) described later, and the query vector can be used without modification as a query hash (a contracted query vector). Moreover, in this case, as peripheral hashes (contracted peripheral vectors) described later, the peripheral vectors generated based on each case example vector can be used.

FIG. 1 is a system configuration diagram illustrating an overview of the data management system according to the first embodiment. As illustrated in FIG. 1, the data management system according to the first embodiment includes a data registration device 100, an index building device 200, a search device 300, and a database 400.

The data registration device 100 receives, from outside, a media data group 10 of images and videos in which a face is captured; performs face-related analysis with respect to the media data group 10; and generates, in the database 400, a data table 20 including a group of feature vectors (case example vectors) related to the facial features.

The index building device 200 receives, from outside, an index building statement 30; retrieves the data table 20 corresponding to the index building statement 30 from the database 400; and, according to the instruction given in the index building statement 30, generates index information 40, which is to be used as the index of facial feature vectors, in the database 400.

The search device 300 receives, from outside, an extended SQL 50 (an example of a search request) including a query request related to facial features; obtains the concerned data table 20 and the index information 40 from the database 400; and outputs a search result dataset 60 that includes a facial feature vector similar to the query vector included in the extended SQL 50.

Firstly, the explanation is given about the details of the data registration device 100. FIG. 2 is a diagram illustrating a specific example of the data table 20 that is generated in the database 400 by the data registration device 100. Herein, it is assumed that the media data included in the media data group 10, which is received from outside by the data registration device 100, is made of three types of files, namely, dir/a.jpg, dir/b.jpg, and dir/a.mpg. Of those files, dir/a.jpg files and dir/b.jpg files are still image files; and dir/a.mpg files are video files.

The data registration device 100 receives the media data group 10 from outside and performs the following operations with respect to each set of media data included in the media data group 10.

Figure 3:
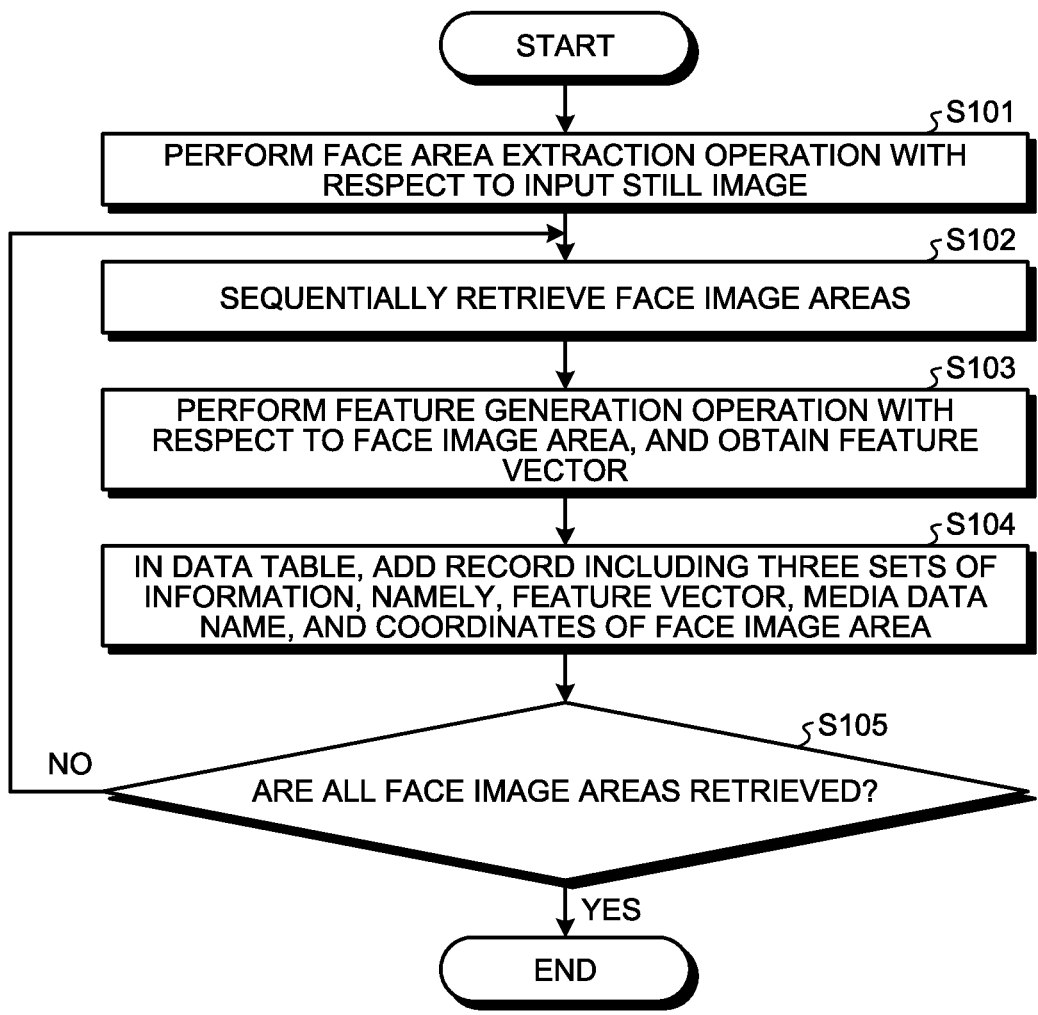
FIG. 3 is a flowchart for explaining an exemplary sequence of operations performed by a data registration device in the case in which media data represents a still image.

FIG. 3 is a flowchart for explaining an exemplary sequence of operations performed by the data registration device 100 in the case in which the media data represents a still image. When the media data is a still image, the data registration device 100 performs, for example, the following operations from Step S101 to Step S105, and registers the media data in the data table 20.

Step S101: The data registration device 100 performs a face area extraction operation with respect to the still image that has been input. As a result, from the input still image, all image areas in which a face is likely to have been captured (face image areas) are extracted. The face area extraction operation can be performed using an existing technology. Hence, the detailed explanation is not given herein.

Step S102: The data registration device 100 sequentially retrieves the face image areas extracted at Step S101.

Step S103: The data registration device 100 performs a feature generation operation with respect to the face image area retrieved at Step S102, and obtains a feature vector (a case example vector). The feature generation operation can be performed using an existing technology. Hence, the detailed explanation is not given herein.

Step S104: The data registration device 100 adds, in the data table 20, a record including three sets of information, namely, the feature vector obtained at Step S103, the media data name assigned to the input still image, and the coordinates of the face image area.

Step S105: The data registration device 100 determines whether or not all face image areas that are extracted at Step S101 have been retrieved. If all face image areas have not been retrieved, then the system control returns to Step S102 and the data registration device 100 again performs the subsequent operations. When all face image areas are retrieved, it marks the end of the operations.

Figure 4:
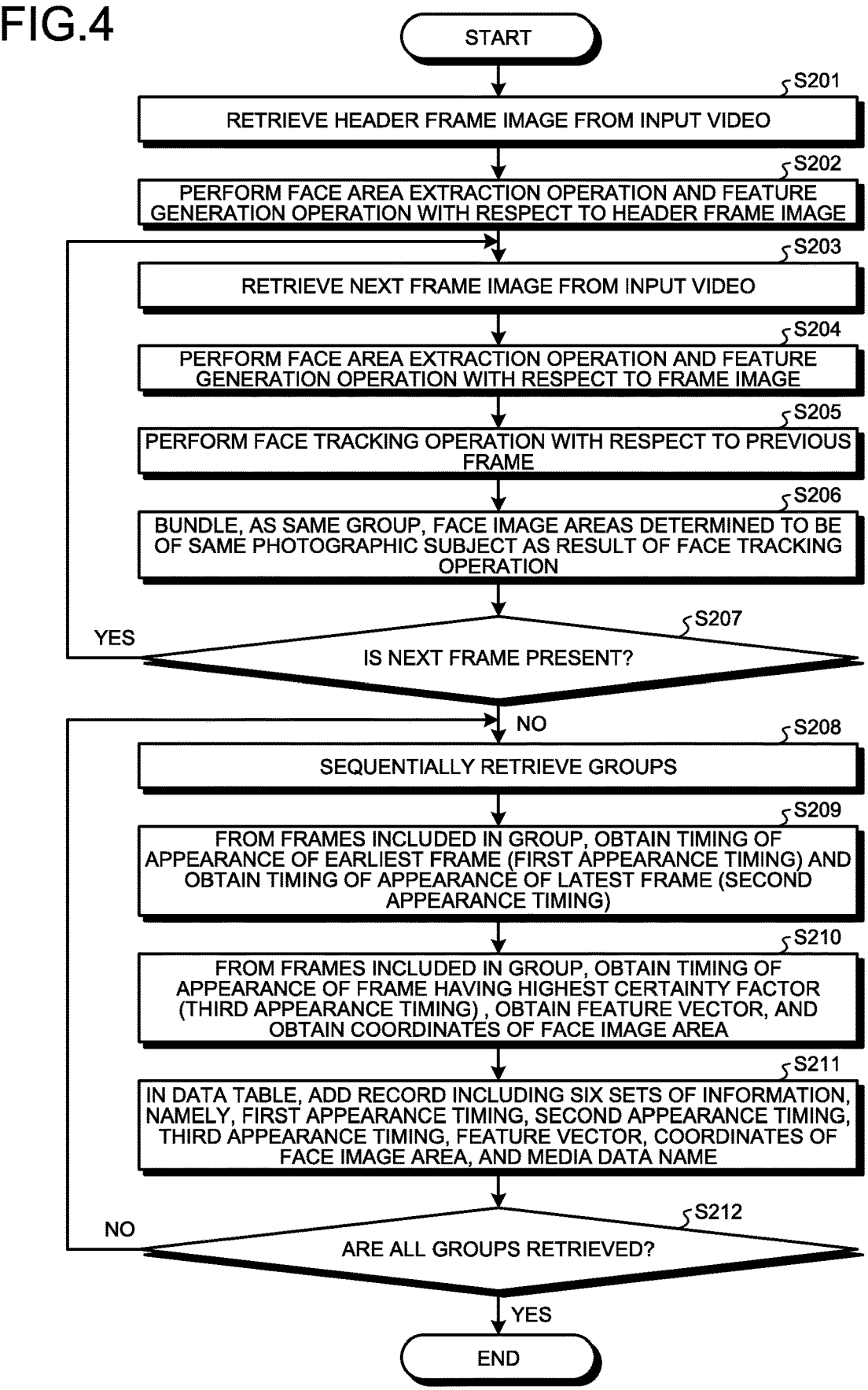
FIG. 4 is a flowchart for explaining an exemplary sequence of operations performed by the data registration device in the case in which media data represents a video.

FIG. 4 is a flowchart for explaining an exemplary sequence of operations performed by the data registration device 100 in the case in which the media data represents a video. When the media data represents a video, the data registration device 100 performs, for example, the following operations from Step S201 to Step S212, and registers the media data in the data table 20.

Step S201: The data registration device 100 retrieves a header frame image from the video that has been input.

Step S202: The data registration device 100 performs a face area extraction operation and a feature generation operation with respect to the header frame image retrieved at Step S201. As a result, all image areas in which a face is likely to have been captured (face image areas) are extracted along with the respective certainty factors, and a feature vector is obtained from each face image area.

Step S203: The data registration device 100 retrieves the next frame image from the input video.

Step S204: The data registration device 100 performs a face area extraction operation and a feature generation operation, which are identical to the operations performed at Step S202, with respect to the frame image retrieved at Step S203.

Step S205: Regarding the concerned frame, the data registration device 100 performs a face tracking operation with respect to the previous frame. In the face tracking operation, a pair of face image areas is found that has similar images and similar area coordinates in the concerned frames, and is interpreted to be of the same photographic subject. The face tracking operation can be performed using an existing technology. Hence, the detailed explanation is not given herein.

Step S206: The data registration device 100 bundles, as the same group, the face image areas determined to be of the same photographic subject as a result of the face tracking operation performed at Step S205.

Step S207: The data registration device 100 determines whether or not the next frame is present. If the next frame is present, then the system control returns to Step S203 and the data registration device 100 again performs the subsequent operations. If the next frame is not present, then the system control proceeds to Step S208.

Step S208: The data registration device 100 sequentially retrieves the groups generated as a result of the operations described above.

Step S209: The data registration device 100 obtains, from the frames included in the group retrieved at Step S208, a first appearance timing representing the timing of appearance of the earliest frame and a second appearance timing representing the timing of appearance of the latest frame.

Step S210: The data registration device 100 obtains, from the frames included in the group retrieved at Step S208, a third appearance timing representing the timing of appearance of the frame having the highest certainty factor; the feature vector; and the coordinates of the face image area.

Step S211: The data registration device 100 adds, in the data table 20, a record including six sets of information, namely, the first appearance timing obtained at Step S209, the second appearance timing obtained at Step S209, the third appearance timing obtained at Step S210, the feature vector obtained at Step S210, the coordinates of the face image area obtained at Step S210, and the media data name assigned to the input video.

Step S212: The data registration device 100 determines whether all generated groups have been retrieved. If all generated groups have not been retrieved, then the system control returns to Step S208 and the data registration device 100 again performs the subsequent operations. When all generated groups are retrieved, it marks the end of the operations.

Given below is the detailed explanation of the index building device 200. The index information 40 that is generated in the database 400 by the index building device 200 represents auxiliary information for enabling speeding up the vector neighbor search with respect to the data table 20 having a column of feature vectors. According to the type of the index building statement 30 that has been input, the index building device 200 can generate two types of the index information 40, namely, LSH immediate index information and LSH neighbor expansion index information. The index information 40 contains table data (described later) and a database index (a B-tree) described later.

The index building device 200 can execute, with respect to the row in which the concerned feature vector is stored in the data table 20, a plurality of index building statements 30 having a different specification about the bit length of the hash; and can build a plurality of sets of index information 40. For example, if two types of the index information 40, namely, the index information 40 for which the hash of a short bit length is used and the index information 40 for which the hash of a long bit length is used are built; then the former index information 40 can be used in the case of performing a search with the focus on speed than accuracy, and the latter index information 40 can be used in the case of performing a search with the focus on accuracy than speed. Thus, separate sets of the index information 40 can be used depending on the intended usage during a search.

FIG. 5 is a block diagram illustrating an exemplary configuration of the index building device 200. As illustrated in FIG. 5, the index building device 200 includes an index building instruction type classifier 210, an LSH immediate index information generator 220, and an LSH neighbor expansion index information generator 230.

The index building instruction type classifier 210 is a switcher for sending the index building statement 30, which is input to the index building device 200, to either the LSH immediate index information generator 220 or the LSH neighbor expansion index information generator 230 according to the type of the index building statement 30.

The index building statement 30 that is input to the index building device 200 has the following configuration, for example. Herein, the xxxx portions have some values inserted therein.

Table:xxxx,Column:xxxx,Algo:xxxx,BitLen:xxxx,HammingDist:xxxx

In the index building statement 30 having the abovementioned configuration, in the item "Table" is specified a table name of the data table 20 which is the target for the index information 40; and in the item "Column" is specified such a column name in the data table 20 which is the target for the index information 40. In the column having the column name in the data table 20, it is necessary to have feature vectors stored.

Moreover, in the item "Algo" is specified an algorithm name of the LSH algorithm used in generating the index information 40. The algorithm name is selected from among the LSH algorithms installed in the system. For example, if there are only two LSH algorithms, namely, an LSH algorithm named SimHash and an LSH algorithm named SpectralHash installed in the system, one of the two algorithm names is specified. In the first embodiment, as described above, since the bitwise LSH is implemented, an algorithm name of the bitwise LSH is specified.

In the item "Bitlen" is specified the bit length of the hash that is output by the LSH algorithm selected in the item "Algo". In the item "HammingDist" is specified the upper limit of the Hamming distance (the range of peripheral hashes described later) handled in the LSH neighbor expansion index information generator 230. For example, when "2" is specified in the item "HammingDist", the Hamming distances handled in the LSH neighbor expansion index information generator 230 are "0", "1", and "2". Meanwhile, alternatively, the item "HammingDist" may be omitted.

When the index building statement 30 configured in the abovementioned manner is input to the index building device 200, the index building instruction type classifier 210 sends the index building statement 30 to either the LSH immediate index information generator 220 or the LSH neighbor expansion index information generator 230. For example, if the index building statement 30 that is input to the index building device 200 does not have the item "HammingDist", then the index building instruction type classifier 210 sends the index building statement 30 to the LSH immediate index information generator 220. On the other hand, if the index building statement 30 that is input to the index building device 200 has the item "HammingDist", then the index building instruction type classifier 210 sends the index building statement 30 to the LSH neighbor expansion index information generator 230.

Upon receiving the index building statement 30 from the index building instruction type classifier 210, the LSH immediate index information generator 220 generates, according to the index building statement 30, LSH immediate index information 40A that contains an LSH immediate table and a database index with respect to a HashValue column in the LSH immediate table.

FIG. 6 is a diagram illustrating an example of the LSH immediate table. As illustrated in FIG. 6, the LSH immediate table represents table data made only of the HashValue column (type: blob). The LSH immediate index information generator 220 sequentially retrieves, for each record in the data table 20 specified in the index building statement 30, the feature vectors stored in the specified column; generates the hash of the specified output bit length using the specified LSH algorithm; and registers the record having only the hashes in the LSH immediate table.

A hash is essentially a binary vector. However, in the first embodiment, a hash is not stored as an array of Boolean values, but is stored as an integer symbolizing the binary. That is, the HashValue column in the LSH immediate table represents a blob for storing integers or an integer array (a measure taken when the bit upper limit of the calculator architecture is exceeded). As a result, it becomes possible to reduce the storage area.

Meanwhile, the configuration can be such that the LSH immediate table is embedded in the data table 20. As a result of such a configuration, subquery processing can be reduced once during the entire processing of a search. In order to embed the LSH immediate table in the data table 20, at the time when the data registration device 100 generates the data table 20, a column for storing the hashes needs to be provided in advance in the data table 20. Moreover, as described above, in order to enable building of a plurality of sets of index information 40 with respect to the row in which the concerned feature vector is stored in the data table 20, a plurality of columns for storing a plurality of types of hashes having different bit lengths needs to be secured in the data table 20. In such a configuration, the LSH immediate index information generator 220 can store the hashes, which are generated based on the feature vectors, in the concerned column in the data table 20 instead of registering them in the LSH immediate table.

In addition to generating the LSH immediate table as described above, the LSH immediate index information generator 220 builds a database index with respect to the HashValue column in the LSH immediate table; and stores the LSH immediate table and the database index as the LSH immediate index information 40A in the database 400.

FIG. 7 is a flowchart for explaining an exemplary sequence of operations performed by the LSH immediate index information generator 220. When the index building statement 30 is received from the index building instruction type classifier 210, the LSH immediate index information generator 220 performs, for example, the following operations from Step S301 to Step S307 and stores the LSH immediate index information 40A containing the LSH immediate table and the database index in the database 400.

Step S301: The LSH immediate index information generator 220 generates, in the database 400, a table (i.e., an empty LSH immediate table) including only a column having name: HashValue/type: blob. The format of table name is "AAAA_BBBB_CCCC_DDDD," where AAAA is assumed to represent the table name of the target data table 20 for processing; BBBB is assumed to represent the column name of the target column for processing; CCCC is assumed to represent the algorithm name of the LSH algorithm; and DDDD is assumed to represent the bit length. For example, a table name aTable_feat_SimHash_64 is assigned to the generated table.

Step S302: The LSH immediate index information generator 220 sequentially retrieves, from the data table 20 specified in the index building statement 30, the feature vectors of the column specified in the index building statement 30.

Step S303: The LSH immediate index information generator 220 implements the LSH algorithm, which is specified in the index building statement 30, with respect to the feature vector retrieved at Step S302, and generates a hash having the output bit length specified in the index building statement 30.

Step S304: The LSH immediate index information generator 220 adds, in the LSH immediate table, a record including the case example hash obtained at Step S303 as a value in the HashValue column.

Step S305: The LSH immediate index information generator 220 determines whether or not all feature vectors have been retrieved from the target data table 20 for processing. If all feature vectors have not been retrieved, then the system control returns to Step S302 and the LSH immediate index information generator 220 again performs the subsequent operations. When all feature vectors are retrieved, the system control proceeds to Step S306.

Step S306: The LSH immediate index information generator 220 builds a database index (a B-tree) with respect to the HashValue column in the LSH immediate table generated as a result of the operations described above, and stores the database index in the database 400.

Step S307: If a model parameter set of the LSH algorithm used in hash generation (for example, a projection vector group in SimHash) is available, then the LSH immediate index information generator 220 stores the database index with the same file name as the table name (for example, aTable_feat_SimHash_64) in the database 400.

The LSH neighbor expansion index information generator 230 receives the index building statement 30 from the index building instruction type classifier 210 and, according to the index building statement 30, generates LSH neighbor expansion index information 40B that contains an LSH neighbor expansion table and contains a database composite index with respect to a HashValue column and a HammingDistance column of the LSH neighbor expansion table.

FIG. 8 is a diagram illustrating an example of the LSH neighbor expansion table. As illustrated in FIG. 8, the LSH neighbor expansion table represents table data made of the HashValue column (type: blob), the HammingDistance column (type: integer), and a DataRowID (type: integer). The LSH neighbor expansion index information generator 230 retrieves the feature vectors from the data table 20 specified in the index building statement 30 and, regarding each feature vector (each case example vector), generates a hash (a contracted case example vector) according to the LSH algorithm and the bit length specified in the index building statement 30. This hash is called a "case example hash". Then, the LSH neighbor expansion index information generator 230 generates, regarding each case example hash, a group of hashes (contracted peripheral vectors) within the Hamming distance specified in the index building statement 30. The hashes generated herein are called "peripheral hashes". Subsequently, for example, the LSH neighbor expansion index information generator 230 registers, in the LSH neighbor expansion table, a record including three sets of information, namely, the peripheral hashes; the Hamming distances from the peripheral hashes to the case example hash; and the row ID of such a record in the data table 20 to which belongs the case example vector representing the basis of the case example hash.

Meanwhile, in the first embodiment, in a DB-indexed LSH search operation described later, the Hamming distance used as a search condition is sequentially incremented from zero and the search results are added. For that reason, in the LSH neighbor expansion table, the HammingDistance column is set as the second column, and the Hamming distances from the peripheral hashes to the corresponding case example hash are stored in the HammingDistance column. However, the configuration can alternatively be such that the distance upper limit of the LSH neighbor expansion table is used as a search condition, and a search is performed. In this case, the HammingDistance column need not be set in the LSH neighbor expansion table. In such a configuration, during the DB-indexed LSH search operation described later, although the number of search result datasets to be output cannot be controlled using the Hamming distance, the size of the LSH neighbor expansion table can be reduced. Moreover, in such a configuration, instead of building a database composite index with respect to the HashValue column and the HammingDistance column of the LSH neighbor expansion table, a database index with respect to the HashValue column of the LSH neighbor expansion table can be built.

Moreover, in the LSH neighbor expansion table illustrated in FIG. 8, there are many duplicate values stored as the values of peripheral hashes in the HashValue column. Hence, normalization can be performed to achieve a compact LSH neighbor expansion table.

FIG. 9 is a diagram illustrating an example in which the LSH neighbor expansion table illustrated in FIG. 8 is normalized by dividing it into two tables. When the LSH neighbor expansion table is configured as illustrated in FIG. 9, during the DB-indexed LSH search operation described later, the row IDs of the table illustrated in FIG. 9A can be finalized using the search conditions related to HashValue and HammingDistance, and DataRowID can be found using the search conditions related to Table1_RowID of the table that is illustrated in FIG. 9B and that is generated based on the finalized row IDs. In the table illustrated in FIG. 9B, Table1_RowID representing the first column stores the row IDs of the corresponding rows in the table illustrated in FIG. 9A. Thus, using that link, if the tables illustrated in FIGS. 9A and 9B are joined, then the LSH neighbor expansion table illustrated in FIG. 8 is obtained as a result.

Meanwhile, the tables illustrated in FIGS. 9A and 9B can alternatively be configured using associative arrays. In the configuration using associative arrays, regarding the associative array of the table illustrated in FIG. 9A, the key is a combination of HashValue and HammingDistance, and the value is one or more row IDs. Regarding the associative array of the table illustrated in FIG. 9B, the key is Table1_RowID and the value is one or more of DataRowID.

Figure 10:
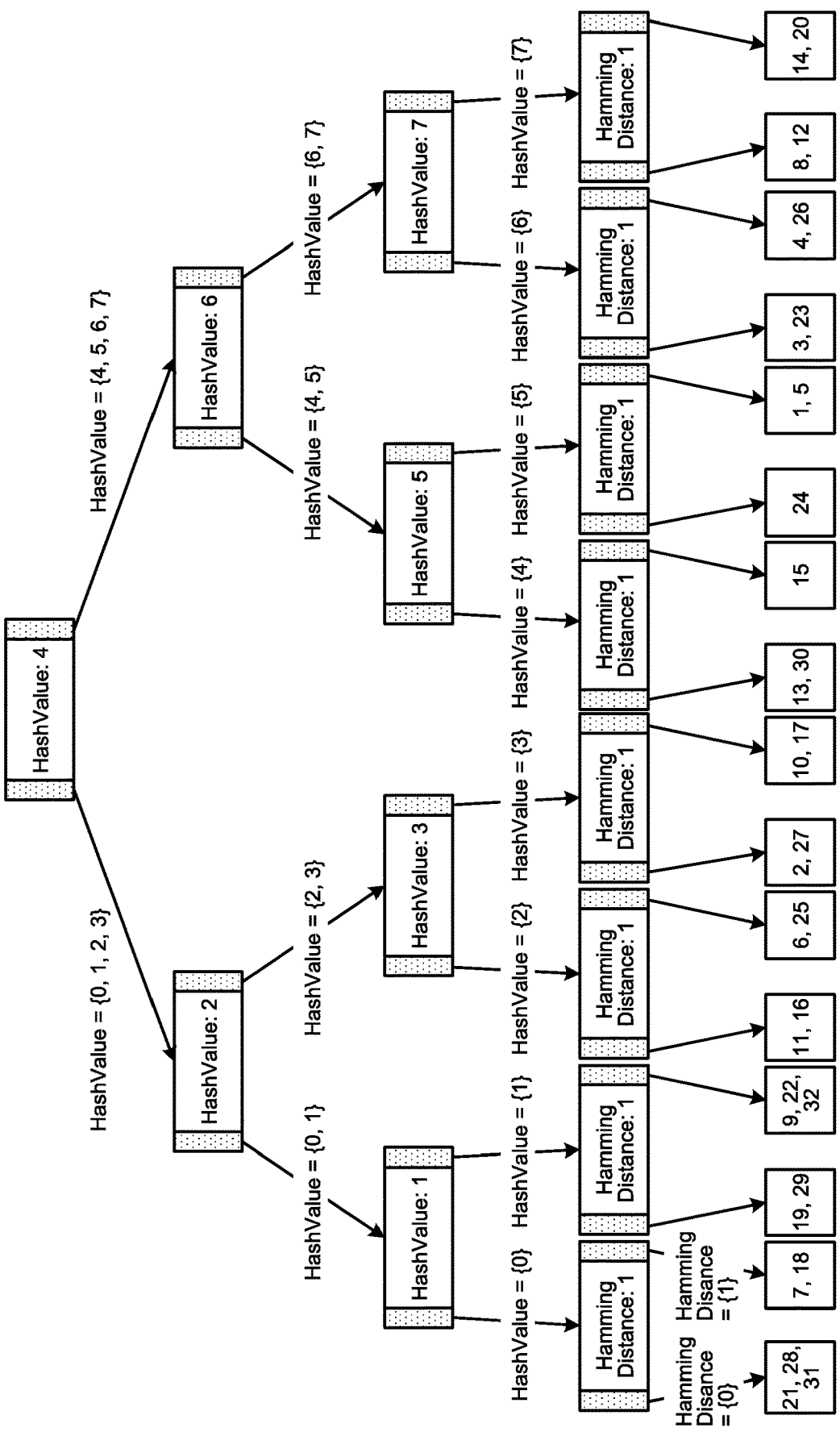
FIG. 10 is a diagram illustrating an exemplary database composite index.

FIG. 10 is a diagram illustrating an example of the database composite index with respect to the HashValue column and the HammingDistance column of the LSH neighbor expansion table. As illustrated in FIG. 10, the database composite index has a tree structure that branches along the values of HashValue and HammingDistance; and row IDs of the LSH neighbor expansion table that are equivalent to leaves are written in the database composite index. As a result of using this database composite index, the search period can be shortened from O(N) to O(log(N)).

Meanwhile, if the configuration of the database composite index is slightly changed, it becomes possible to make the LSH neighbor expansion table unnecessary. More particularly, in the leaves of the database composite index, instead of storing the row IDs of the LSH neighbor expansion table, the values of DataRowID are stored. As a result, although only DataRowID becomes searchable, the LSH neighbor expansion table need not be stored in the database 400. In this case, the LSH neighbor expansion index information 40B represents only the database composite index.

Figure 11:
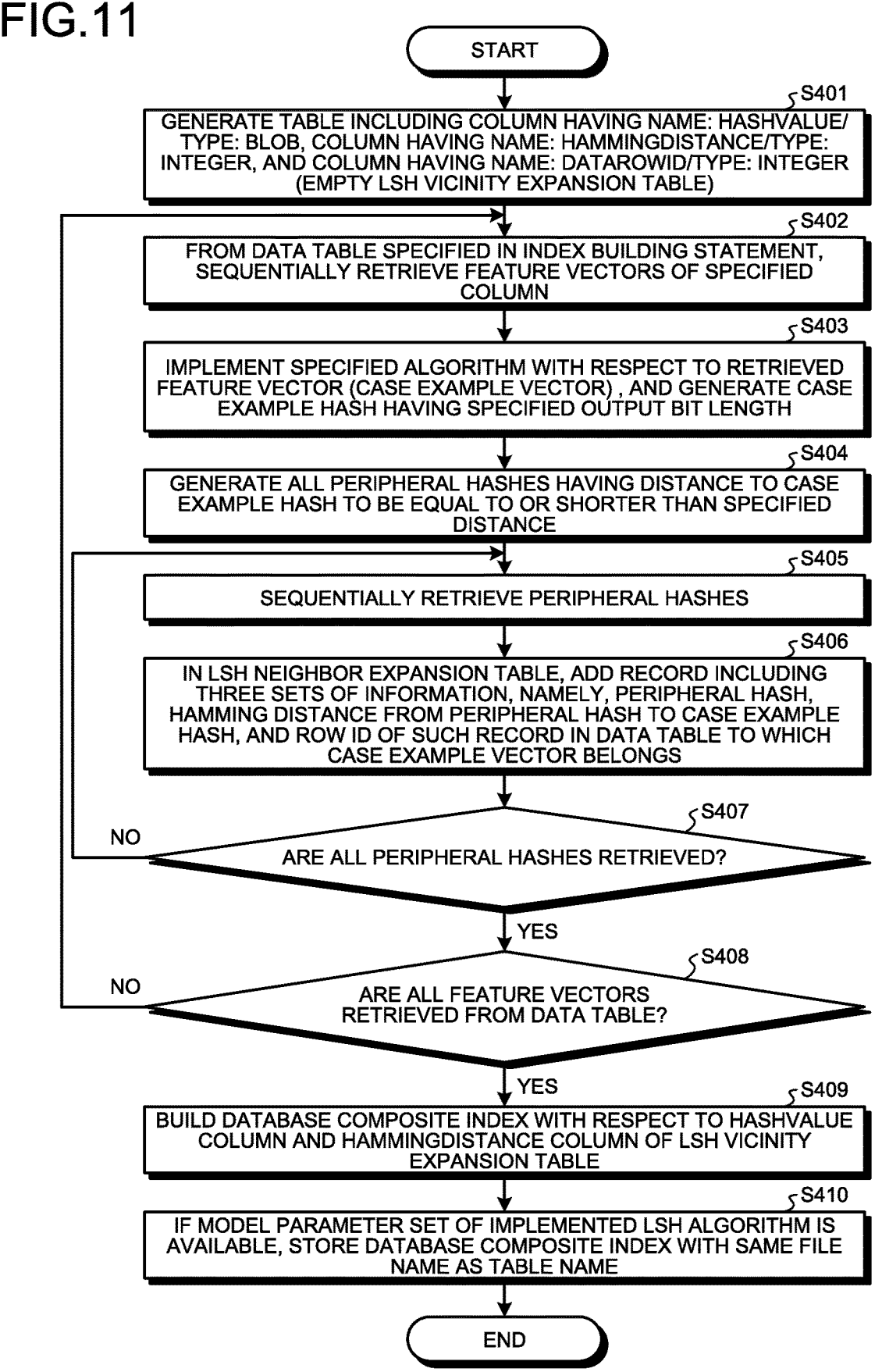
FIG. 11 is a flowchart for explaining an exemplary sequence of operations performed by an LSH neighbor expansion index information generator.

FIG. 11 is a flowchart for explaining an exemplary sequence of operations performed by the LSH neighbor expansion index information generator 230. When the index building statement 30 is received from the index building instruction type classifier 210, the LSH neighbor expansion index information generator 230 performs, for example, the following operations from Step S401 to Step S410 and stores the LSH neighbor expansion index information 40B, which contains the LSH neighbor expansion table and the database composite index, in the database 400.

Step S401: The LSH neighbor expansion index information generator 230 generates, in the database 400, a table (i.e., an empty LSH neighbor expansion table) including a column having name: HashValue/type: blob, a column having name: HammingDistance/type: integer, and a column having name: DataRowID/type: integer. Herein, the format of the table name is "AAAA_BBBB_CCCC_DDDD", where AAAA represents the table name of the target data table 20 for processing, BBBB represents the column name of the target column for processing, CCCC represents the algorithm name of the LSH algorithm, and DDDD represents the bit length. For example, a table name aTable_feat_PQ_3 is assigned to the generated table.

Step S402: The LSH neighbor expansion index information generator 230 sequentially retrieves, from the data table 20 specified in the index building statement 30, the feature vectors of the column specified in the index building statement 30.

Step S403: The LSH neighbor expansion index information generator 230 implements the LSH algorithm, which is specified in the index building statement 30, with respect to the feature vector (the case example vector) retrieved at Step S402, and generates a case example hash having the bit length specified in the index building statement 30.

Step S404: The LSH neighbor expansion index information generator 230 generates all peripheral hashes having the distance to the case example hash, which is obtained at Step S403, to be equal to or shorter than a specified distance.

Step S405: The LSH neighbor expansion index information generator 230 sequentially retrieves the peripheral hashes obtained at Step S404.

Step S406: The LSH neighbor expansion index information generator 230 adds, in the LSH neighbor expansion table, a record including three sets of information, namely, the peripheral hash retrieved at Step S405; the Hamming distance from the peripheral hash to the case example hash; and the row ID of the record in the data table 20 to which belongs the case example vector representing the basis of the case example hash.

Step S407: The LSH neighbor expansion index information generator 230 determines whether or not all peripheral hashes obtained at Step S404 have been retrieved. If all peripheral hashes have not been retrieved, then the system control returns to Step S405 and the LSH neighbor expansion index information generator 230 performs the subsequent operations. When all peripheral hashes are retrieved, the system control proceeds to Step S408.

Step S408: The LSH neighbor expansion index information generator 230 determines whether or not all feature vectors have been retrieved from the target data table 20 for processing. If all feature vectors have not been retrieved, then the system control returns to S402 and the LSH neighbor expansion index information generator 230 performs the subsequent operations. When all feature vectors are retrieved, the system control proceeds to Step S409.

Step S409: The LSH neighbor expansion index information generator 230 builds a database composite index with respect to the HashValue column and the HammingDistance column of the LSH neighbor expansion table generated as a result of the operations described above, and stores the database composite index in the database 400.

Step S410: If a model parameter set of the LSH algorithm used in case example hash generation is available, then the LSH neighbor expansion index information generator 230 stores the data composite index with the same file name as the table name (for example, aTable_feat_PQ_3) in the database 400.

Given below is the explanation of a specific example of the method of generating the peripheral hashes as performed at Step S404. In the following explanation, it is assumed that the case example hash representing the starting point of the peripheral hashes has the bit sequence "010", and the explanation is given for a setting example in which the peripheral hashes having the Hamming distance equal to or shorter than two are listed.

Firstly, the peripheral hash having the Hamming distance of zero is the same hash as the case example hash. That is, if the case example hash has the bit sequence of "010", then the peripheral hashes having the Hamming distance of zero with respect to the case example hash include only the peripheral hash having the bit sequence of "010".

The peripheral hashes having the Hamming distance of one are obtained by inverting any arbitrary single bit of the case example hash. If the case example hash has the bit length of three, then the method of selecting the bits to be inversed includes three types, namely, inverting only a first bit, inverting only second bits, and inverting third bits. If the case example hash has the bit sequence of "010", then the result of bit inversion obtained according to each selection method is "110", "000", and "011", respectively. These three hashes represent the peripheral hashes having the Hamming distance of one to the case example hash "010".

The peripheral hashes having the Hamming distance of two are obtained by inverting any arbitrary two bits of the case example hash. If the case example hash has the bit length of three, then the method of selecting the bits to be inversed includes three types, namely, inverting the first bit and the second bit, inverting the first bit and the third bit, and inverting the second bit and third bit. If the case example hash has the bit sequence of "010", then the result of bit inversion obtained according to each selection method is "100", "111", and "001", respectively. These three hashes represent the peripheral hashes having the Hamming distance of two to the case example hash "010".

To summarize, with respect to the case example hash "010", the peripheral hashes having the Hamming distance of zero include the peripheral hash "010"; the peripheral hashes having the Hamming distance of one include the peripheral hashes "110", "000", and "011"; and the peripheral hashes having the Hamming distance of two include the peripheral hashes "100", "111", and "001". In this way, all peripheral hashes can be generated by performing low-cost operations.

Meanwhile, at the time of generating the peripheral hashes with respect to a case example hash according to the method described above, a mechanism can be provided for restricting the allowed bits for inversion based on the degree of importance of the bits. For example, in the case of a hash generation method based on principal component analysis as in the case of Reference Literature 3 mentioned earlier, the distinctiveness (the degree of importance) of each bit can be determined from the fixed value corresponding to that bit. A peripheral hash generated by inverting such bits in the case example hash which have high distinctiveness happens to lose the distinctiveness. Hence, even if such a peripheral hash is added in the LSH neighbor expansion table, it is believed that the probability of a hit is low. Thus, it is also possible to apply a restriction not to allow inversion of the bits having a high distinctiveness. In this way, as a result of restricting the allowed bits for inversion, it becomes possible to reduce the memory area size of the LSH neighbor expansion table.

In the LSH neighbor expansion table, the columns serving as search keys and the columns representing the search result are decided. Hence, the LSH neighbor expansion table can be succinctly configured using associative arrays (such as key value store; or, in C++ standard library, std::map or std::unordered_map).

That is, since DataRowID represents the search result, a variable-length continuous memory arrangement array of DataRowID (in C++ standard library, std::vector) is used. Since the search condition is the logical AND of HashValue and HammingDistance, those two values are used to generate a unique key of associative arrays. In the case of the LSH neighbor expansion table illustrated in FIG. 8, the HashValue column takes values from "000" to "111" in the binary notation, and the HammingDistance column takes values from "0" to "1". Hence, it is possible to think of the following formula for calculating the key value.

key value=value of HashValue column×2+value of HammingDistance

Figure 12A:
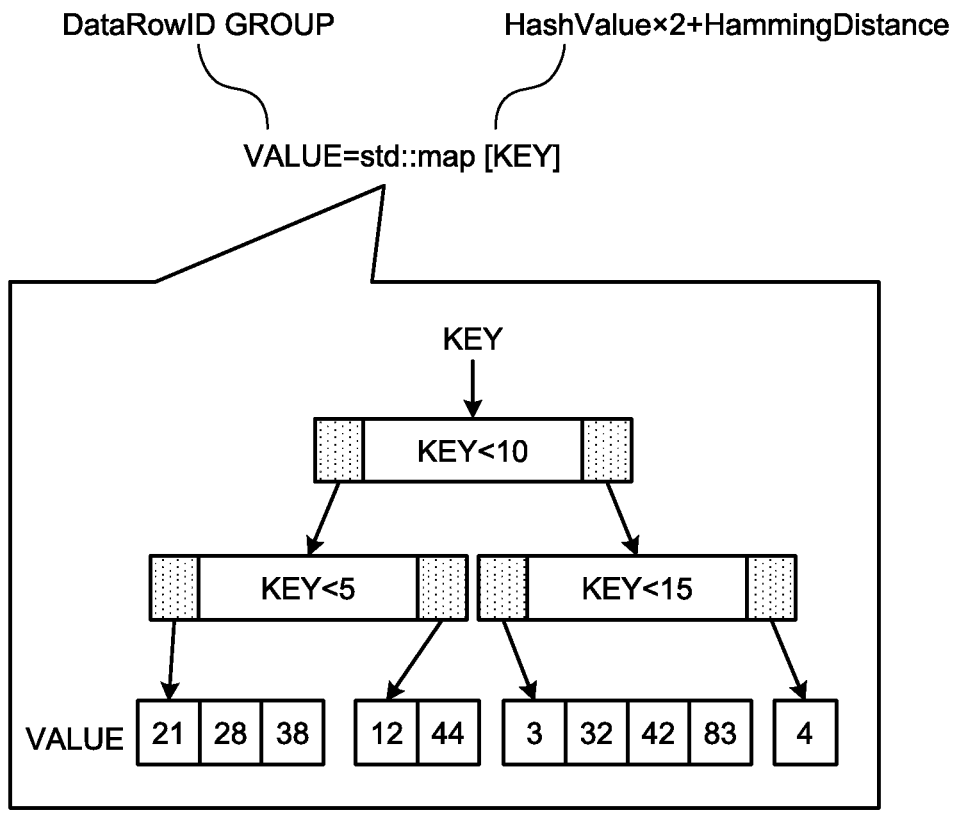
FIGS. 12A and 12B are diagrams for explaining an associative array and a continuous memory arrangement array.
Figure 12B:
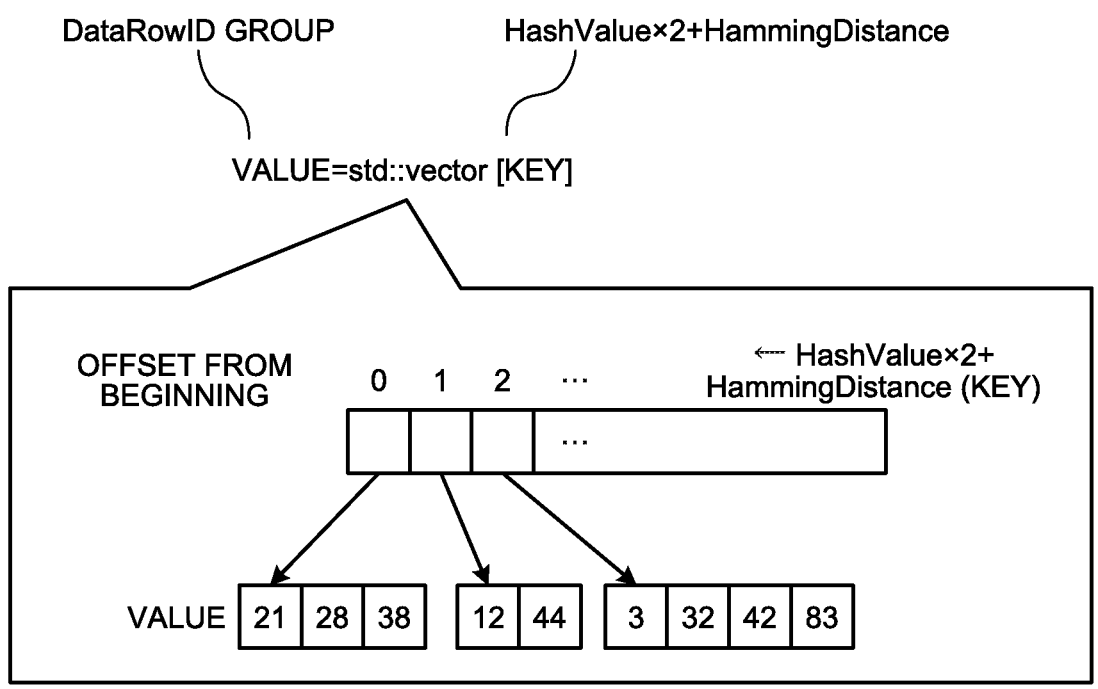

FIGS. 12A and 12B are diagrams for explaining an associative array and a continuous memory arrangement array. In an associative array, as a method of association from keys to values, a data structure such as a tree or hashing for database indexing is present as illustrated in FIG. 12A. If the abovementioned key is approximately applied in the defined domain, then the associative array can be substituted with a continuous memory arrangement array (in C++ standard library, std::vector) as illustrated in FIG. 12B. The number of elements to be secured as the continuous memory arrangement array is set to be the total number of combinations of HashValue and HammingDistance. As compared to a data structure in which an associative array is used, in a data structure in which a continuous memory arrangement array is used; only when the application ratio of the key is high, the memory usage is reduced and the processing speed is also enhanced.

Given below is the detailed explanation of the search device 300. The functional overview and the features of the search device 300 are as follows. In the search device 300, records can be searched using the extended SQL 50 with logical conditions including zero or more conditions related to vector similarity. As a result, the database user becomes able to perform a search using a logical expression in which the commonly-used data collation and the feature vector similarity determination are associated as conditions.

Meanwhile, regarding the vector similarity determination (the vector neighbor search), depending on the number of records to be retrieved, the determination can be performed by internally switching among five methods. The switching is performed based on the system setting done in advance. The five methods have merits and demerits regarding the presence or absence of speed, accuracy, and count control. One of the five methods is the DB-indexed LSH search in which, with respect to a query, vector similarity determination (vector neighbor search) is performed using only database indexing without performing vector distance calculation at the time of the search. In this method, the search period can be reduced in a significant manner.

Figure 13:
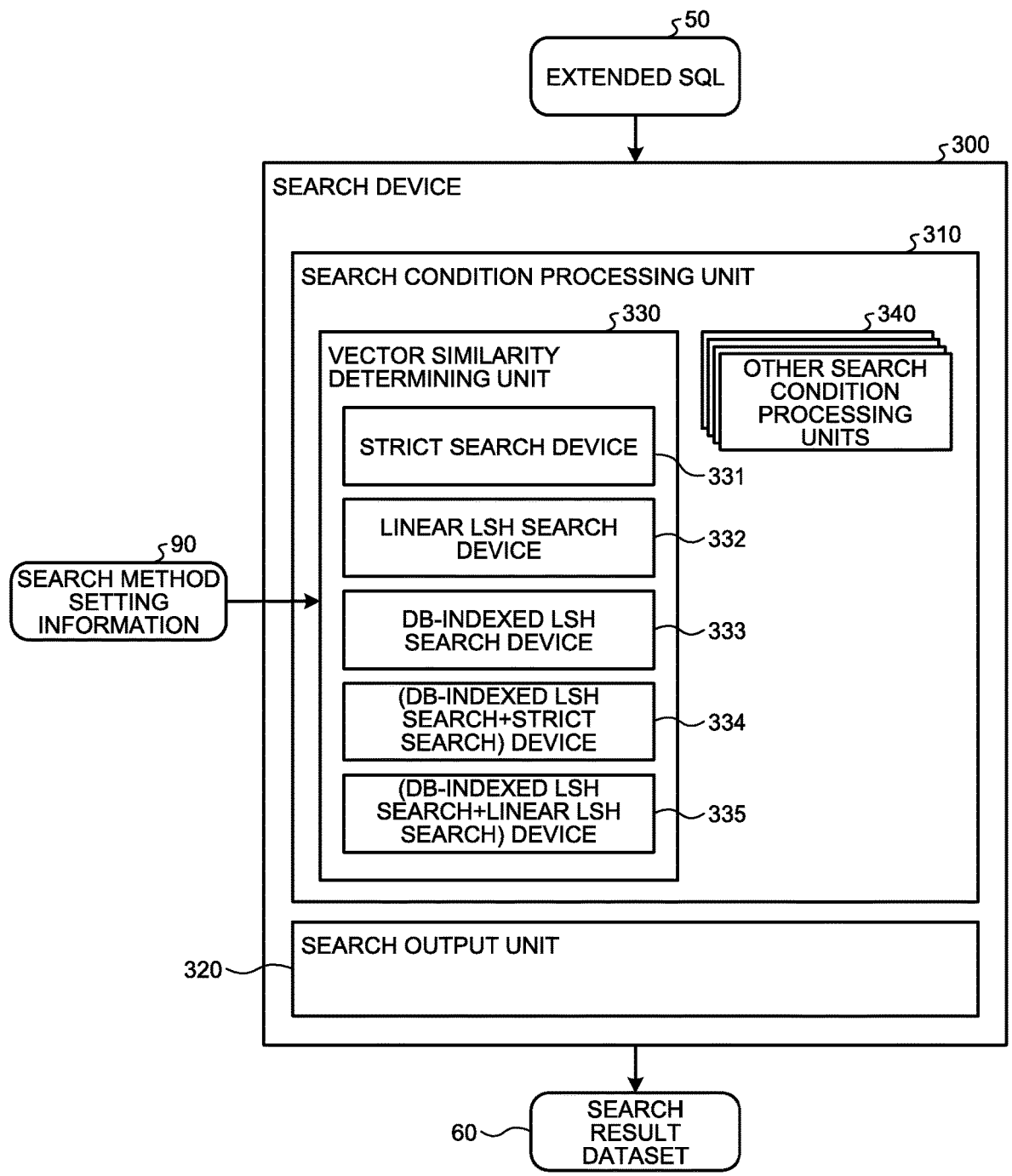
FIG. 13 is a block diagram illustrating an exemplary configuration of a search device.

FIG. 13 is a block diagram illustrating an exemplary configuration of the search device 300. The search device 300 receives the extended SQL 50 as input, performs a search operation according to the extended SQL 50, and outputs the search result dataset 60. As illustrated in FIG. 13, the search device 300 includes a search condition processing unit 310 and a search output unit 320. The search condition processing unit 310 has functional modules for internally processing various search conditions. Of those functional modules, particularly a vector similarity determining unit 330 represents the functional module for processing the search condition related to the vector similarity that is characteristic to the first embodiment. Moreover, the functional modules for processing other types of search conditions are collectively referred to as other search condition processing units 340. The search condition processing unit 310 performs a set operation of the search result obtained from the vector similarity determining unit 330 and the other search condition processing units 340, and completes the processing of the overall search conditions. The search output unit 320 retrieves records from the database 400 based on the processing result of the search condition processing unit 310, and outputs the processing result as the search result dataset 60.

Meanwhile, a large part of the search operation performed by the search device 300 is identical to the conventional SQL-based search operation; and the search condition processing unit 310 is equivalent to a "from" instructing unit (data source identification) and a "where" instructing unit (search condition processing) in the SQL, while the search output unit 320 is equivalent to a "select" instructing unit in the SQL. In the first embodiment, the operations performed by the vector similarity determining unit 330, which is one of the functional modules in the search condition processing unit 310, are unique to the first embodiment. Hence, the following explanation is given with the focus on the vector similarity determining unit 330, and the portion in which the conventional technology is applicable without modification is not explained.

Firstly, the explanation is given about the extended SQL 50 received as input by the search device 300. The extended SQL 50 is an extended query language meant to enable writing of a vnn function, which represents a condition related to vector similarity, in the conventional SQL. As given below in the example, the vnn function is used as a term that can be combined with the group of search conditions with respect to a commonly-used DB basic type data in a "where" instruction.

```
select*from aTable where vnn(feat_simhash_64,(10,
    20,30),10) and annualIncome>10000000
```

The vnn function has the following specifications.

Input: the vnn function receives input of the dataset to be retrieved. This input is generated internally by the search condition processing unit 310 and is sent at the time of calling the vnn function. In the case of a usual statement, the input is the group of all records in the table specified in the "from" instruction.

First argument: the first argument is a text formed by concatenating the following using underscores: the name of the column for storing case example vectors (the feature vectors to be retrieved); the algorithm name of the LSH algorithm implemented in that column; and the output bit length (in a third embodiment described later, set as an optional parameter with more generalization) of the LSH algorithm implemented in that column.

Second argument: the second argument is a query vector. Third argument: the third argument is an output upper level count (the upper level count of the vectors to be output). Herein, the vectors having a short distance to the query vector are treated to be in the upper level.

Output: a search result matching with the conditions specified in the arguments is returned to the search condition processing unit 310 (in response to the operations such as "from" and "where").

Meanwhile, herein, although the output upper level count representing an output condition is set as the third argument, the distance upper limit can alternatively be set as the third argument.

Figure 14:
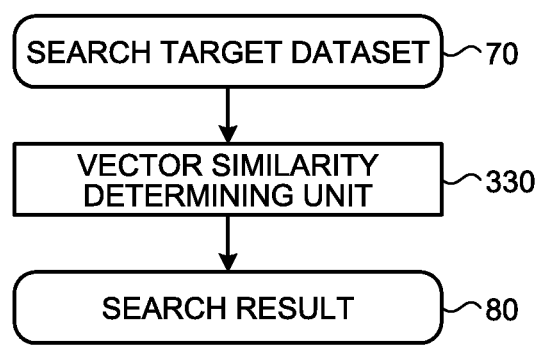
FIG. 14 is a diagram illustrating the input-output relationship of a vector similarity determining unit.

FIG. 14 is a diagram illustrating the input-output relationship of the vector similarity determining unit 330. As illustrated in FIG. 14, the vector similarity determining unit 330 receives input of a search target dataset 70; performs vector similarity determination (a vector neighbor search) based on the search condition expressed by the vnn function; and returns a search result 80. In the first embodiment, as the search methods implemented by the vector similarity determining unit 330, the following five methods are provided: a strict search, a linear LSH search, a DB-indexed LSH search, a combination of the DB-indexed LSH search and the strict search, and a combination of the DB-indexed LSH search and the linear LSH search.

The strict search is a search method in which the original query request is used without modification and a linear search is performed for the case example vectors similar to the query vector. The linear LSH search is a search method in which the LSH immediate index information 40A is used and a linear search is performed for the case example vectors that correspond to the case example hashes exactly matching with the query hash. The DB-indexed LSH search is a search method in which the LSH neighbor expansion index information 40B is used and a search is performed for the case example vectors that correspond to the peripheral hashes exactly matching with the query hash. The combination of the DB-indexed LSH search and the strict search is a search method including two-step narrowing down in which the number of records is narrowed down according to the DB-indexed LSH search and then the strict search is performed. The combination of the DB-indexed LSH search and the linear LSH search is a search method including two-step narrowing down in which the number of records is narrowed down according to the DB-indexed LSH search and then the linear LSH search is performed. The search according to these five methods is performed by a strict search device 331, a linear LSH search device 332, a DB-indexed LSH search device 333, a (DB-indexed LSH search+strict search) device 334, and a (DB-indexed LSH search+linear LSH search) device 335, respectively, as illustrated in FIG. 13.

Moreover, in the first embodiment, it is assumed that the vector similarity determining unit 330 selects, based on search method setting information 90 provided in advance (see FIG. 13), one of the abovementioned five search methods depending on the number of records to be retrieved. The search method setting information 90 has the following grammar including a plurality of lines. The count condition is collated from top and the matching search method is adapted.

count condition: search method
count condition: search method
. . .
otherwise: search method In the search method, it is possible to specify "≤NNNN" (where NNNN is an arbitrary positive number) or "otherwise". The search condition "≤NNNN" has a match when the number of case example vectors to be retrieved is equal to or smaller than NNNN. The search condition "otherwise" has a match with any number of records. Moreover, in the search method setting information 90, the search condition "otherwise" always needs to be included for one line.

In the search condition, the following five types can be written: "Strict" (strict search)", "LinearLSH" (linear LSH search), "DBIndexedLSH" (DB-indexed LSH search), "DBIndexedLSH:NNNN/Strict" (DB-indexed LSH search+strict search), and DBIndexedLSH:NNNN/LinearLSH (DB-indexed LSH search+linear LSH search). Herein, NNNN can have an arbitrary positive number substituted therein.

Given below is the explanation of a description example of the search method setting information 90. In the search method setting information 90, it is specified that the strict search is adapted if the number of case example vectors to be retrieved is equal to or smaller than 10000; the linear LSH search is adapted if the number of case example vectors to be retrieved is equal to or smaller than 100000; and the combination of the DB-indexed LSH search and the linear LSH search is adapted if the number of case example vectors to be retrieved is greater than 100000.

≤10000: Strict
≤100000: LinearLSH
Otherwise: DBIndexedLSH: 100000/LinearLSH

Figure 15:
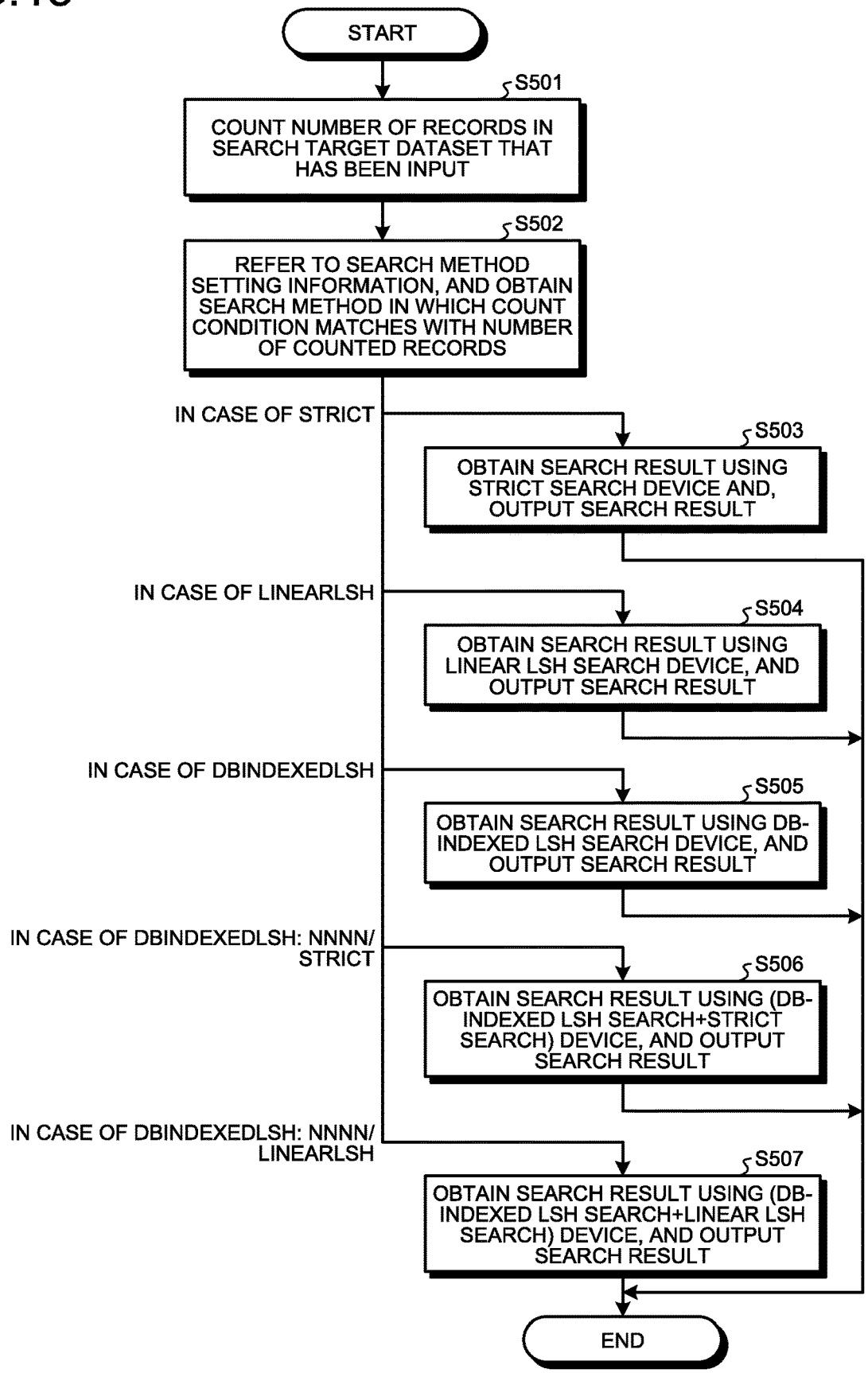
FIG. 15 is a flowchart for explaining an exemplary sequence of operations performed by the vector similarity determining unit.

FIG. 15 is a flowchart for explaining an exemplary sequence of operations performed by the vector similarity determining unit 330. The vector similarity determining unit 330 receives input of the search target dataset 70; performs, for example, the following operations from Step S501 to Step S507; and outputs the search result 80.

Step S501: The vector similarity determining unit 330 counts the number of records (the number of case example vectors to be retrieved) in the search target dataset 70 that has been input.

Step S502: The vector similarity determining unit 330 refers to the search method setting information 90 and obtains the search method in which the count condition matches with the number of records counted at Step S501. If the search method "Strict" is obtained, then the system control proceeds to Step S503. If the search method "LinearLSH" is obtained, then the system control proceeds to Step S504. If the search method "DBIndexedLSH" is obtained, then the system control proceeds to Step S505. If the search method "DBIndexedLSH:NNNN/Strict" (where NNNN is an arbitrary positive number) is obtained, then the system control proceeds to Step S506. If the search method "DBIndexedLSH:NNNN/LinearLSH" is obtained, then the system control proceeds to Step S507.

Step S503: The vector similarity determining unit 330 obtains the search result 80 using the strict search device 331, and outputs the search result 80.

Step S504: The vector similarity determining unit 330 obtains the search result 80 using the linear LSH search device 332, and outputs the search result 80.

Step S505: The vector similarity determining unit 330 obtains the search result 80 using the DB-indexed LSH search device 333, and outputs the search result 80.

Step S506: The vector similarity determining unit 330 obtains the search result 80 using the (DB-indexed LSH search+strict search) device 334, and outputs the search result 80.

Step S507: The vector similarity determining unit 330 obtains the search result 80 using the (DB-indexed LSH search+linear LSH search) device 335, and outputs the search result 80.

In the example given above, the search method is changed according to the number of case example vectors to be retrieved. Alternatively, it is possible to have an expansion in which the search methods to be adapted are specified along with various parameter settings such as the bit length. For example, it is possible to have a plan in which the number of case example vectors is narrowed down to 100000 using the linear LSH search having a short bit length of 16 bits (that is, the processing period for each item is short, but the accuracy is low), and then the ranking is done using the linear LSH search having a long bit length of 4069 bits (that is, the processing period for each item is long, but the accuracy is high). In that case, a description example of the search method setting information 90 is given below (parameter settings are listed after "@").

100000: LinearLSH@4096
otherwise: LinearLSH@16:100000/LinearLSH@4096

Given below is the explanation of a specific example of the search operation performed according to each search method.

Figure 16:
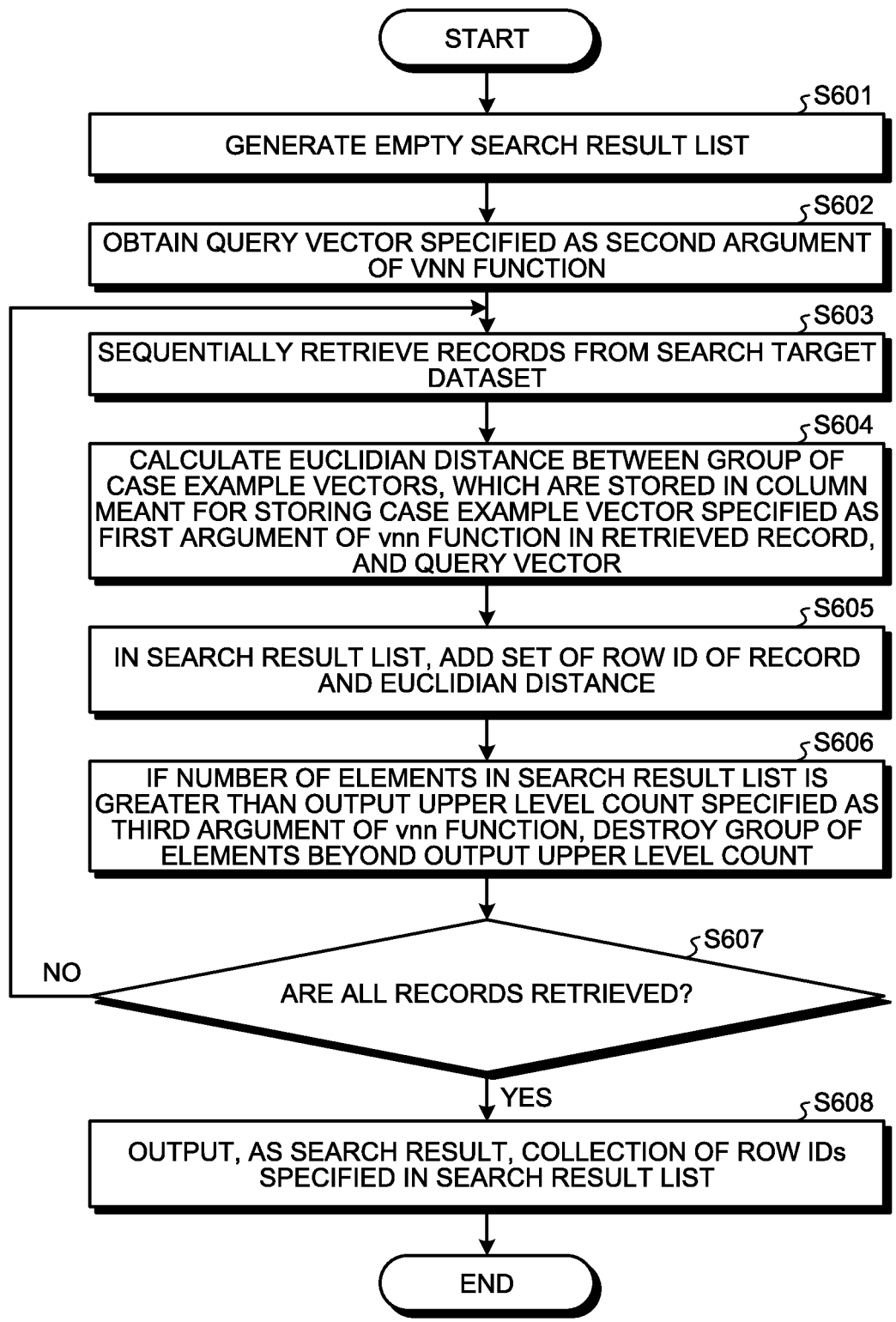
FIG. 16 is a flowchart for explaining an exemplary sequence of operations performed by a strict search device.

FIG. 16 is a flowchart for explaining an exemplary sequence of operations performed by the strict search device 331. The strict search device 331 performs, for example, the following operations from Step S601 to S608, and outputs the search result 80.

Step S601: The strict search device 331 generates an empty search result list.

Step S602: The strict search device 331 obtains the query vector that is specified as the second argument of the vnn function.

Step S603: The strict search device 331 sequentially retrieves records from the search target dataset 70.

Step S604: The strict search device 331 calculates the Euclidian distance between the group of case example vectors, which are stored in the column meant for storing case example vector specified as the first argument of the vnn function in the record retrieved at Step S603, and the query vector.

Step S605: The strict search device 331 adds, in the search result list, the set of the row ID of the record retrieved at Step S603 and the Euclidian distance calculated at Step S604. Herein, the position of insertion in the search result list is such that the Euclidian distances get listed in ascending order.

Step S606: If the number of elements in the search result list is greater than the output upper level count specified as the third argument of the vnn function, then the strict search device 331 destroys the group of elements beyond the output upper level count.

Step S607: The strict search device 331 determines whether or not all records have been retrieved from the search target dataset 70. If all records have not been retrieved, then the system control returns to Step S603 and the strict search device 331 again performs the subsequent operations. When all records are retrieved, the system control proceeds to Step S608.

Step S608: The strict search device 331 outputs, as the search result 80, the collection of row IDs specified in the search result list. It marks the end of the operations.

Figure 17:
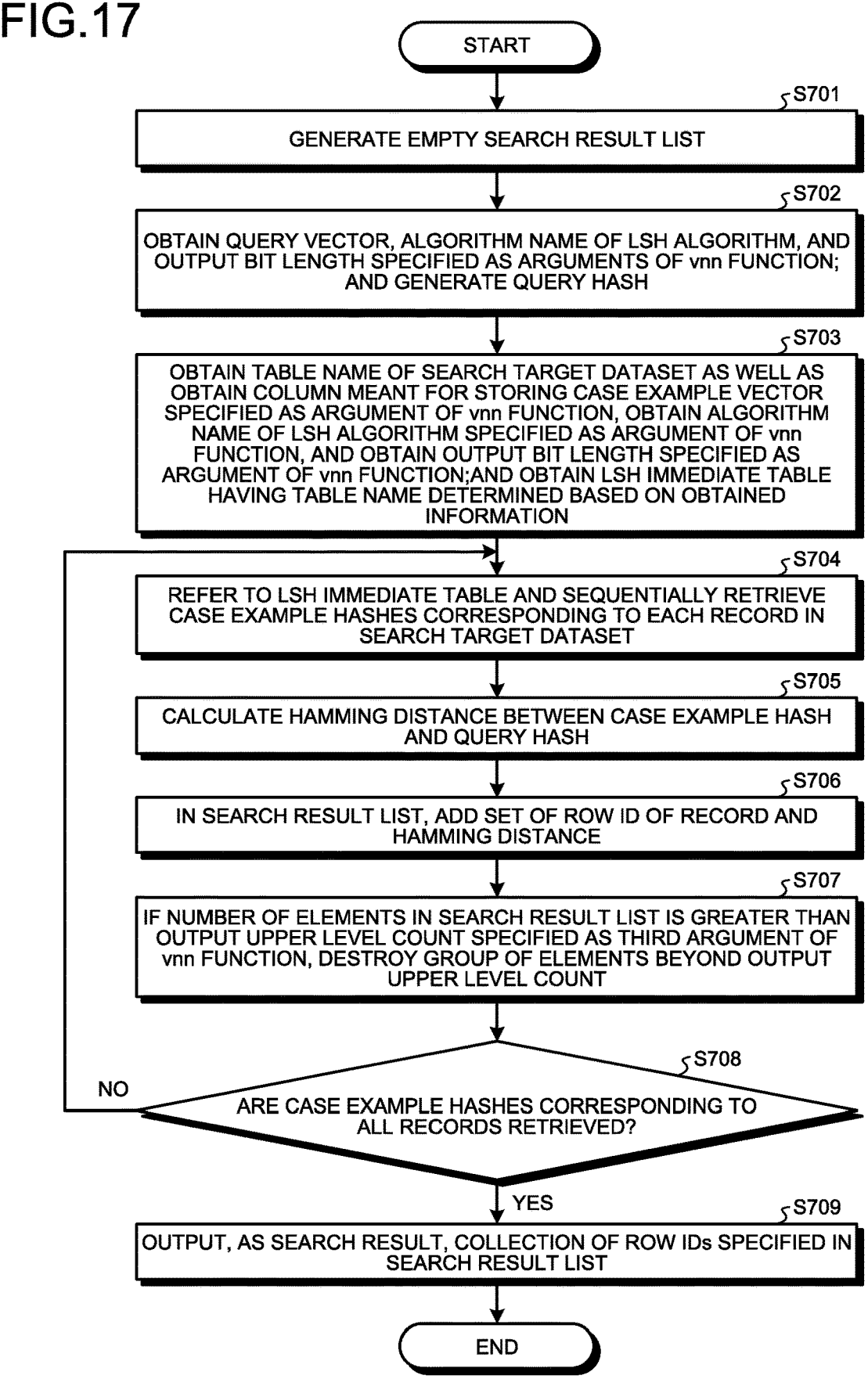
FIG. 17 is a flowchart for explaining an exemplary sequence of operations performed by a linear LSH search device.

FIG. 17 is a flowchart for explaining an exemplary sequence of operations performed by the linear LSH search device 332. The linear LSH search device 332 performs, for example, the following operations from Step S701 to Step S709, and outputs the search result 80.

Step S701: The linear LSH search device 332 generates an empty search result list.

Step S702: The linear LSH search device 332 obtains the query vector, the algorithm name of the LSH algorithm, and the output bit length specified as the arguments of the vnn function; and generates a hash of the query vector (i.e., a contracted query vector). Hereinafter, the generated hash is called a "query hash".

Step S703: The linear LSH search device 332 obtains the table name of the search target dataset 70 as well as obtains the column meant for storing the case example vector specified as an argument of the vnn function, obtains the algorithm name of the LSH algorithm specified as an argument of the vnn function, and obtains the output bit length specified as an argument of the vnn function; and then obtains the LSH immediate table that has the table name determined based on them.

Step S704: The linear LSH search device 332 refers to the LSH immediate table obtained at Step S703, and sequentially retrieves case example hashes corresponding to each record in the search target dataset 70.

Step S705: The linear LSH search device 332 calculates the Hamming distance between the case example hash retrieved at Step S704 and the query hash generated at Step S702.

Step S706: The linear LSH search device 332 adds, in the search result list, the set including the row ID of such a record in the search target dataset 70 which corresponds to the case example hash retrieved at Step S704 and including the Hamming distance calculated at Step S705. Herein, the position of insertion in the search result list is such that the Hamming distances get listed in ascending order.

Step S707: If the number of elements included in the search result list is greater than the output upper level count specified as the third argument of the vnn function, then the linear LSH search device 332 destroys the group of elements beyond the output upper level count.

Step S708: The linear LSH search device 332 determines whether or not all case example hashes corresponding to each record in the search target dataset 70 have been retrieved. If all case example hashes have not been retrieved, then the system control returns to Step S704 and the linear LSH search device 332 again performs the subsequent operations. When all case example hashes are retrieved, the system control proceeds to Step S709.

Step S709: The linear LSH search device 332 outputs, as the search result 80, the collection of row IDs included in the search result list. It marks the end of the operations.

Meanwhile, although the query hash that is generated at Step S702 explained earlier is essentially a binary vector, it is treated as an integer symbolizing the binary in tune with the storage format in the LSH immediate table. As a result, not only the memory area can be saved, but the collation operation becomes faster because of comparison of integers.

Figure 18:
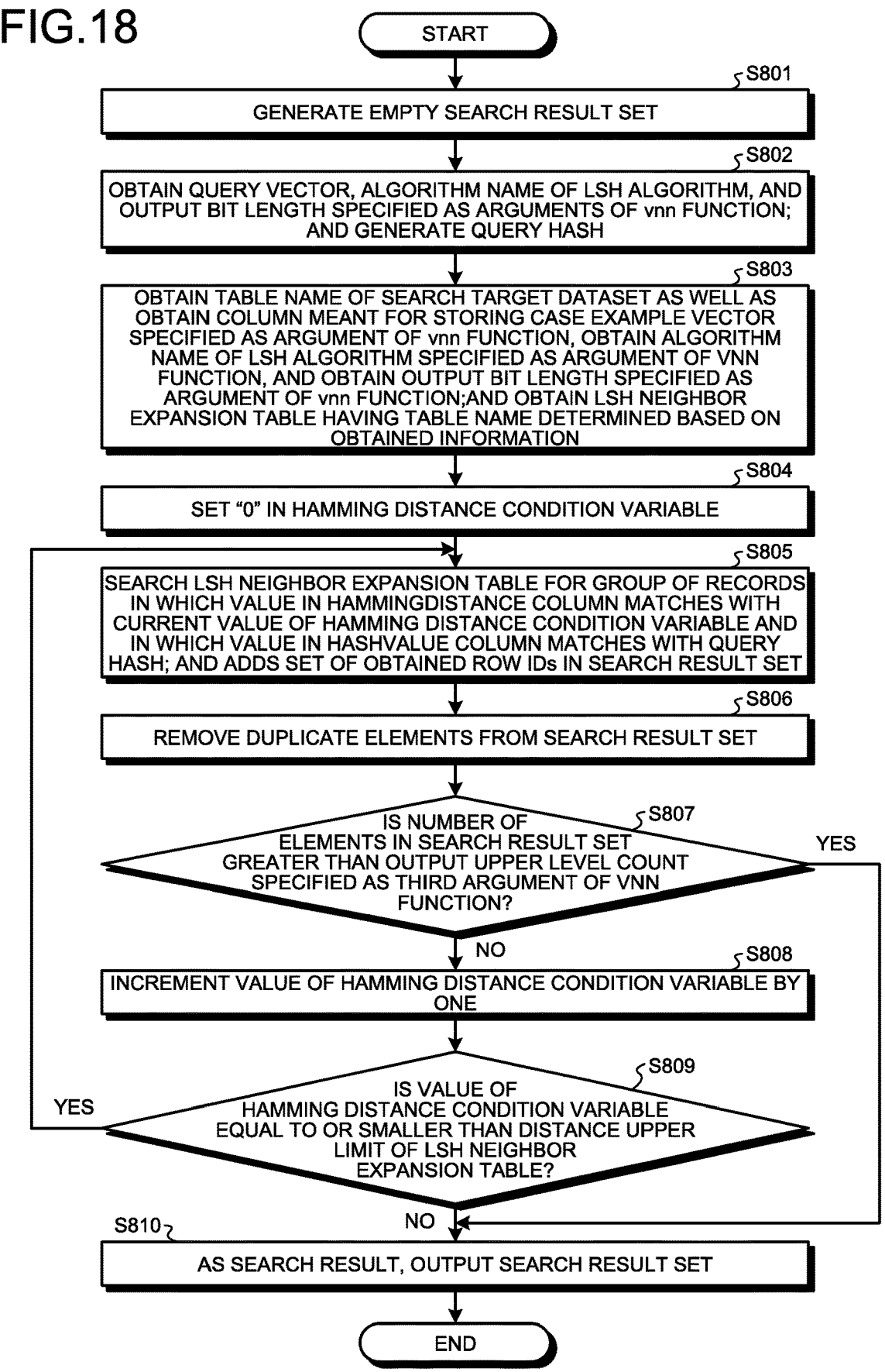
FIG. 18 is a flowchart for explaining an exemplary sequence of operations performed by a DB-indexed LSH search device.

FIG. 18 is a flowchart for explaining an exemplary sequence of operations performed by the DB-indexed LSH search device 333. The DB-indexed LSH search device 333 performs, for example, the following operations from Step S801 to Step S810, and outputs the search result 80.

Step S801: The DB-indexed LSH search device 333 generates an empty search result set.

Step S802: The DB-indexed LSH search device 333 obtains the query vector, the algorithm name of the LSH algorithm, and the output bit length specified as the arguments of the vnn function; and generates a query hash.

Step S803: The DB-indexed LSH search device 333 obtains the table name of the search target dataset 70 as well as obtains the column meant for storing the case example vector specified as an argument of the vnn function, obtains the algorithm name of the LSH algorithm specified as an argument of the vnn function, and obtains the output bit length specified as an argument of the vnn function; and then obtains the LSH neighbor expansion table that has the table name determined based on them.

Step S804: The DB-indexed LSH search device 333 sets "0" in a Hamming distance condition variable.

Step S805: The DB-indexed LSH search device 333 searches the LSH neighbor expansion table, which is obtained at Step S803, for the group of records in which the value in the HammingDistance column matches with the current value of the Hamming distance condition variable and in which the value in the HashValue column matches with the query hash generated at Step S802; and adds the set of obtained row IDs in the search result set.

Step S806: The DB-indexed LSH search device 333 removes duplicate elements from the search result set.

Step S807: The DB-indexed LSH search device 333 determines whether or not the number of elements in the search result set is equal to or greater than the output upper level count specified as the third argument of the vnn function. If the number of elements is not equal to or greater than the output upper level count, then the system control proceeds to Step S808. Otherwise, the system control proceeds to Step S810.

Step S808: The DB-indexed LSH search device 333 increments the value of the Hamming distance condition variable by one.

Step S809: The DB-indexed LSH search device 333 determines whether or not the value of the Hamming distance condition variable is equal to or smaller than the distance upper limit of the LSH neighbor expansion table. If the value of the Hamming distance condition variable is equal to or smaller than the distance upper limit, then the system control returns to Step S805 and the DB-indexed LSH search device 333 again performs the subsequent operations. Otherwise, the system control proceeds to Step S810.

Step S810: The DB-indexed LSH search device 333 outputs the search result set as the search result 80. It marks the end of the operations.

Meanwhile, although the query hash that is generated at Step S802 explained earlier is essentially a binary vector, it is treated as an integer symbolizing the binary in tune with the storage format in the LSH neighbor expansion table. As a result, not only the memory area can be saved, but the collation operation becomes faster because of comparison of integers. Moreover, if the distance upper limit of the LSH neighbor expansion table is a large value such as 100, then the value of increment at Step S808 can be set to be a greater value such as 10, and a range can be set in the Hamming distance condition at Step S805. That results in a decrease in the iteration count, thereby enabling achieving enhancement in the speed of the entire search operation.

Figure 19:
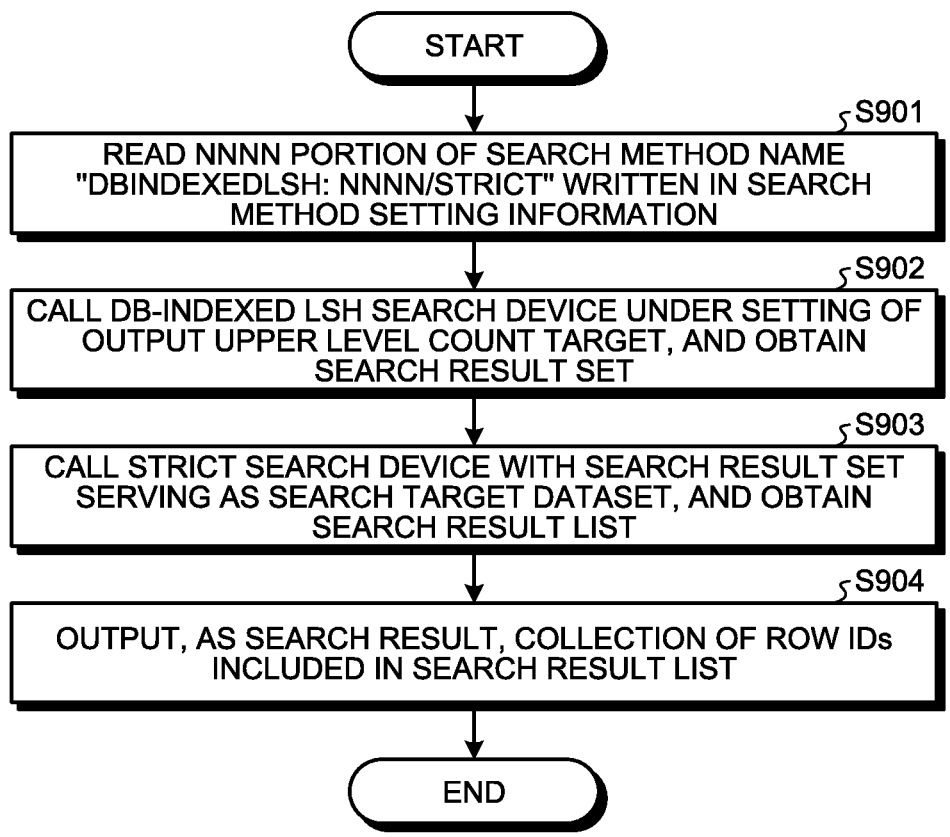
FIG. 19 is a flowchart for explaining an exemplary sequence of operations performed by a (DB-indexed LSH search+strict search) device.

FIG. 19 is a flowchart for explaining an exemplary sequence of operations performed by the (DB-indexed LSH search+strict search) device 334. The combination of the DB-indexed LSH search and the strict search includes two-step narrowing down in which a search is performed according to the DB-indexed LSH search and the search result is then searched according to the strict search. The (DB-indexed LSH search+strict search) device 334 performs, for example, the following operations from Step S901 to Step S904, and outputs the search result 80.

Step S901: The (DB-indexed LSH search+strict search) device 334 reads the NNNN portion of the search method name "DBIndexedLSH:NNNN/Strict" written in the search method setting information 90. That serves as the output upper level count target in the DB-indexed LSH search.

Step S902: The (DB-indexed LSH search+strict search) device 334 calls the DB-indexed LSH search device 333 for the setting of the output upper level count target, and obtains a search result set.

Step S903: The (DB-indexed LSH search+strict search) device 334 calls the strict search device 331 with the search result set, which is obtained from the DB-indexed LSH search device 333, serving as the search target dataset 70; and obtains a search result list.

Step S904: The (DB-indexed LSH search+strict search) device 334 outputs, as the search result 80, the collection of row IDs included in the search result list obtained from the strict search device 331. It marks the end of the operations.

Figure 20:
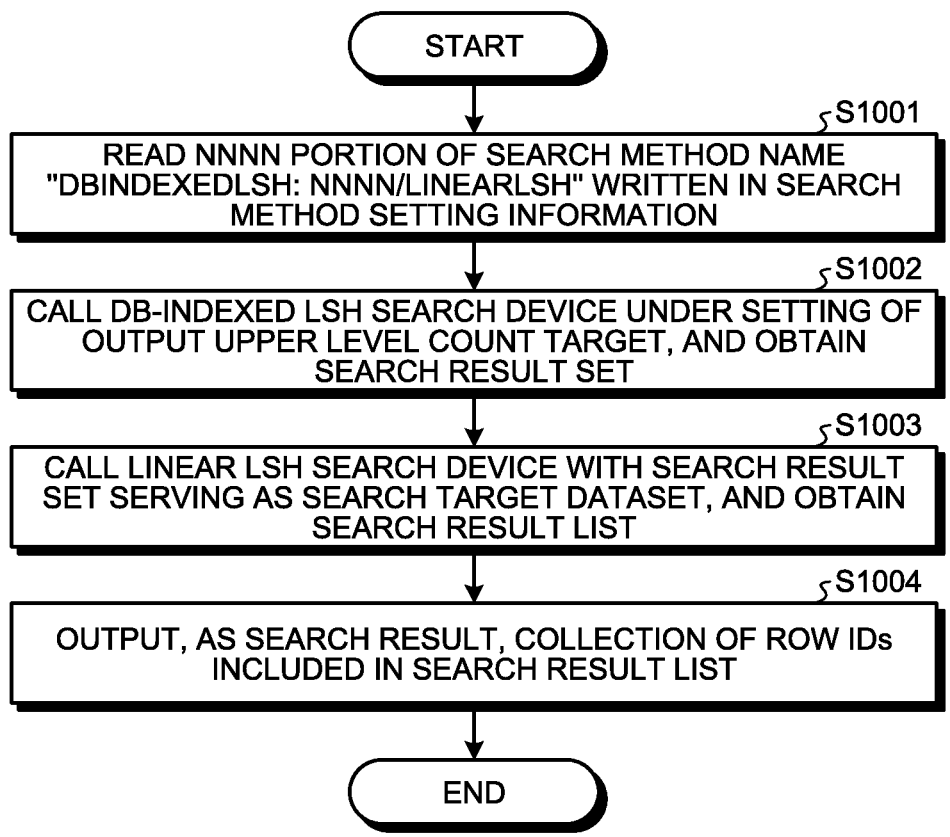
FIG. 20 is a flowchart for explaining an exemplary sequence of operations performed by a (DB-indexed LSH search+linear LSH search) device.

FIG. 20 is a flowchart for explaining an exemplary sequence of operations performed by the (DB-indexed LSH search+linear LSH search) device 335. The combination of the DB-indexed LSH search and the linear LSH search includes two-step narrowing down in which a search is performed according to the DB-indexed LSH search and the search result is then searched according to the linear LSH search. The (DB-indexed LSH search+linear LSH search) device 335 performs, for example, the following operations from Step S1001 to Step S1004, and outputs the search result 80.

Step S1001: The (DB-indexed LSH search+linear LSH search) device 335 reads the NNNN portion of the search method name "DBIndexedLSH:NNNN/LinearLSH" written in the search method setting information 90. That serves as the output upper level count target in the DB-indexed LSH search.

Step S1002: The (DB-indexed LSH search+linear LSH search) device 335 calls the DB-indexed LSH search device 333 for the setting of the output upper level count target, and obtains a search result set.

Step S1003: The (DB-indexed LSH search+linear LSH search) device 335 calls the linear LSH search device 332 with the search result set, which is obtained from the DB-indexed LSH search device 333, serving as the search target dataset 70; and obtains a search result list.

Step S1004: The (DB-indexed LSH search+linear LSH search) device 335 outputs, as the search result 80, the collection of row IDs included in the search result list obtained from the linear LSH search device 332. It marks the end of the operations.

Given below is the explanation about the selection criteria for selecting a method from among the five methods described above. If N represents the number of sets of data and if D represents the number of dimensions of the feature vectors; then the calculation cost (the cumulated count) of the three search methods including the strict search, the linear LSH search, and the DB-indexed LSH search is as follows:

strict search: $N \times D$ linear LSH search: N (when the output bit length of the LSH algorithm is set to be equal to or smaller than 64)

DB-indexed LSH search: $\alpha$ (database indexing cost)

Since $\alpha$ is too smaller than N, the DB-indexed LSH search has the lowest cost from among the three search methods mentioned above.

As far as the accuracy is concerned, the strict search has the highest accuracy, the linear LSH search has the second highest accuracy, and the DB-indexed LSH search has the lowest accuracy. It is obvious to have the highest accuracy in the strict search because the LSH representing an approximative method is not used. However, even if the same LSH algorithm is used, the DB-indexed LSH search has a lower accuracy than the linear LSH search because of the fact that large bit lengths and large Hamming distances cannot be handled in the DB-indexed LSH search. The DB-indexed LSH search includes referring to the inside of the LSH neighbor expansion table in which all hashes equal to or smaller than the Hamming distance are expanded as records. If H represents the Hamming distance and L represents the bit length, a record count S is expressed as given below in Equation (1).

$$S = N \sum_{h}^{H} {}_L C_h \quad (1)$$

As can be understood from Equation (1), if the LSH having a large Hamming distance and a large bit length are handled, it results in an explosion of the record count. For that reason, the LSH having a small Hamming distance and a small bit length is handled. In that case, the distance resolution undergoes a decline, and it becomes difficult to accurately match the actually-output number of records to the requested output count. This problem may arise in any search method in which the LSH is used, such as the linear LSH search and the DB-indexed LSH search. However, the problem becomes conspicuous particularly in the DB-indexed LSH search in which the LSH having only a small Hamming distance and a small bit length is used. In order to overcome that drawback, in the case of the combination of the DB-indexed LSH search and the strict search or the combination of the DB-indexed LSH search and the linear LSH search, it is effective to use two-step narrowing down in which a search method enabling easy control of the output count is implemented in the second step; and some extra output count is output in the DB-indexed LSH search in the first step, and the output count is accurately matched with the request in the second-step search.

In this way, in order to achieve as high accuracy as possible while keeping the search speed within the acceptable range; it is effective to implement the strict search when there is a small number of records in the search target dataset 70, it is effective to implement the linear LSH search when there is a moderate number of records in the search target dataset 70, and it is effective to implement either the combination of the DB-indexed LSH search and the strict search or the combination of the DB-indexed LSH search and the linear LSH search when there is a large number of records in the search target dataset 70.

As described above in detail with reference to specific examples, in the data management system according to the first embodiment, the index information 40 containing the LSH neighbor expansion index information 40B is generated as a result of preprocessing; and, at the time of performing a search, the index information 40 is used to identify the case example vectors that correspond to the peripheral vectors exactly matching with the query vector. Thus, a vector neighbor search with respect to the data table 20 is performed with only a small amount of calculations. Hence, it becomes possible to reduce the amount of calculations in the vector neighbor search representing the majority of the amount of calculations in the conventional similarity search, and it becomes possible to shorten the execution period of the data search.

Second Embodiment

Given below is the explanation of the data management system according to a second embodiment. In the second embodiment, the configuration is such that, at the time of a search, peripheral vectors having the distance to the query vector to be equal to or smaller than a predetermined value are generated, and case example vectors exactly matching with the peripheral vectors are found. With that, a system is achieved in which the memory usage is reduced and thus the LSH accuracy is enhanced.

In the first embodiment, in order to implement the DB-indexed LSH search, an LSH neighbor expansion table and a database composite index are internally used. As described earlier, such structural data becomes bloated in size if the bit length and the Hamming distance upper limit of the hashes are large. However, since there are limitations to the memory capacity of a disk or the like used as the memory area for the database 400, there are times when a large bit length and a large Hamming distance upper limit cannot be handled. Thus, if a sufficiently large bit length and a sufficiently large Hamming distance cannot be handled, it may lead to a decline in the search accuracy.

In the second embodiment, instead of the case according to the first embodiment in which the group of peripheral hashes, which represent the hashes (binary vectors) in the vicinity of the case example hash representing the hash (a binary vector) of each case example vector representing the search target, is enumerated; the group of hashes (binary vectors) in the neighbor of the hash (a binary vector) of the query vector is enumerated as the group of peripheral hashes. In this method, since it is sufficient to store only the group of hashes enumerated for a single vector, the problem of limitations of the memory capacity is resolved, thereby enabling avoiding the risk of a decline in the search accuracy. However, since the query becomes complex as compared to the first embodiment, there is a decrease in the search speed as compared to the first embodiment.

The data management system according to the second embodiment has an identical fundamental framework to the framework according to the first embodiment. However, in the second embodiment, since the LSH neighbor expansion index information 40B is not used during a search, the index building device 200 (see FIG. 5) includes only the LSH immediate index information generator 220 for generating the LSH immediate index information 40A. Moreover, since the peripheral hashes originating from the query hash are generated during a search, the vector similarity determining unit 330 of the search device 300 implements a different search method than the method implemented in the first embodiment. The following explanation is given about the search method according to the second embodiment that is the major change from the first embodiment.

Figure 21:
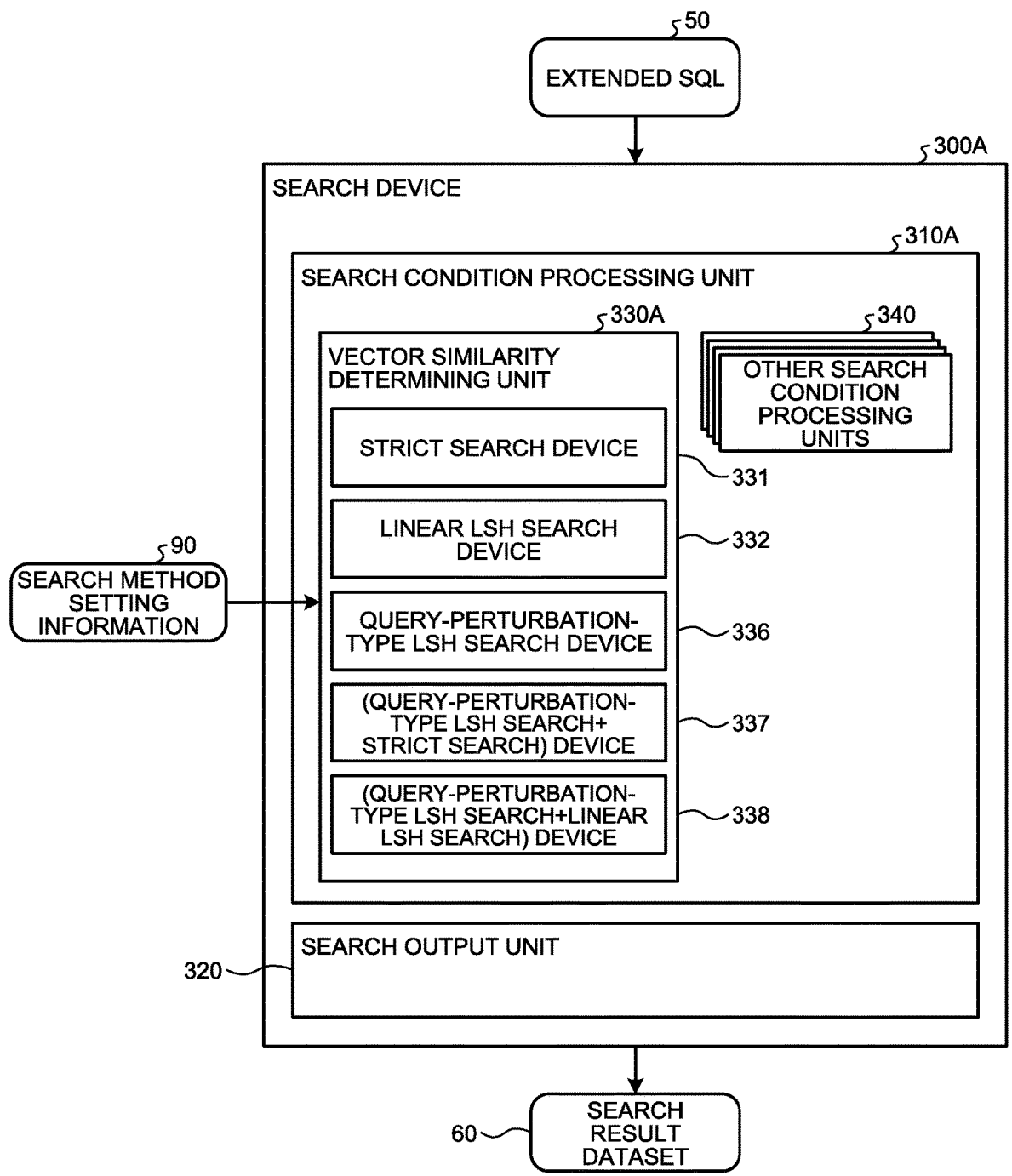
FIG. 21 is a block diagram illustrating an exemplary configuration of a search device according to a second embodiment.

FIG. 21 is a block diagram illustrating an exemplary configuration of a search device 300A according to the second embodiment. As compared to the first embodiment, the second embodiment differs in the way that a vector similarity determining unit 330A includes a query-perturbation-type LSH search device 336, a (query-perturbation-type LSH search+strict search) device 337, and a (query-perturbation-type LSH search+linear LSH search) device 338 instead of including the DB-indexed LSH search device 333, the (DB-indexed LSH search+strict search) device 334, and the (DB-indexed LSH search+linear LSH search) device 335.

Regarding the (query-perturbation-type LSH search+strict search) device 337 and the (query-perturbation-type LSH search+linear LSH search) device 338, except for the fact that a query-perturbation-type LSH search is performed in place of the DB-indexed LSH search as the first step in the two-step narrowing down method, the remaining portion is identical to the (DB-indexed LSH search+strict search) device 334 and (DB-indexed LSH search+linear LSH search) device 335, respectively, according to the first embodiment. Hence, the following explanation does not include the explanation about the (query-perturbation-type LSH search+strict search) device 337 and the (query-perturbation-type LSH search+linear LSH search) device 338, and includes the explanation only about the query-perturbation-type LSH search device 336.

Figure 22:
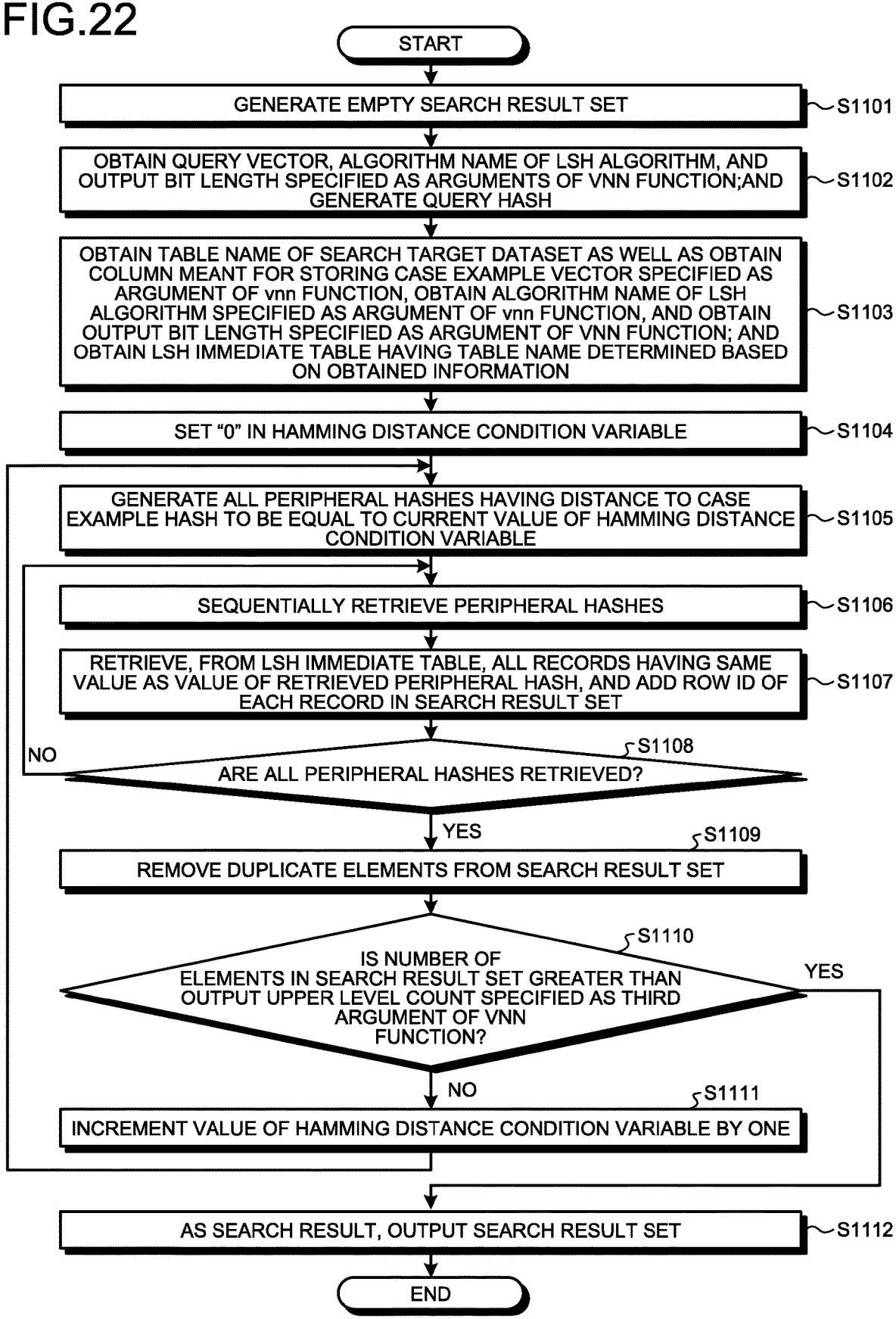
FIG. 22 is a flowchart for explaining an exemplary sequence of operations performed by a query-perturbation-type LSH search device.

FIG. 22 is a flowchart for explaining an exemplary sequence of operations performed by the query-perturbation-type LSH search device 336. The query-perturbation-type LSH search device 336 performs, for example, the following operations from Step S1101 to Step S1112, and outputs the search result 80.

Step S1101: The query-perturbation-type LSH search device 336 generates an empty search result set.

Step S1102: The query-perturbation-type LSH search device 336 obtains the query vector, the algorithm name of the LSH algorithm, and the output bit length specified as the arguments of the vnn function; and generates a query hash.

Step S1103: The query-perturbation-type LSH search device 336 obtains the table name of the search target dataset 70 as well as obtains the column meant for storing the case example vector specified as an argument of the vnn function, obtains the algorithm name of the LSH algorithm specified as an argument of the vnn function, and obtains the output bit length specified as an argument of the vnn function; and then obtains the LSH immediate table that has the table name determined based on them.

Step S1104: The query-perturbation-type LSH search device 336 assign "0" to the Hamming distance condition variable.

Step S1105: The query-perturbation-type LSH search device 336 generates all peripheral hashes that have the distance from the query hash, which is generated at Step S1102, to be equal to the current value of the Hamming distance condition variable.

Step S1106: The query-perturbation-type LSH search device 336 sequentially retrieves the peripheral hashes generated at Step S1105.

Step S1107: The query-perturbation-type LSH search device 336 retrieves, from the LSH immediate table obtained at Step S1103, the group of all records having the same value as the value of the peripheral hash retrieved at Step S1106, and adds the row ID of each record in the search result set.

Step S1108: The query-perturbation-type LSH search device 336 determines whether or not all peripheral hashes generated at Step S1105 have been retrieved. If all peripheral hashes have not been retrieved, then the system control returns to Step S1106 and the query-perturbation-type LSH search device 336 again performs the subsequent operations. When all peripheral hashes are retrieved, the system control proceeds to Step S1109.

Step S1109: The query-perturbation-type LSH search device 336 removes duplicate elements from the search result set.

Step S1110: The query-perturbation-type LSH search device 336 determines whether or not the number of elements in the search result set is equal to or greater than the output upper level count specified as the third argument of the vnn function. If the number of elements is not equal to or greater than the output upper level count, then the system control proceeds to Step S1111. Otherwise, the system control proceeds to Step S1112.

Step S1111: The query-perturbation-type LSH search device 336 increments the value of the Hamming distance condition variable by one.

Step S1112: The query-perturbation-type LSH search device 336 outputs the search result set as the search result 80. It marks the end of the operations.

As described above, in the data management system according to the second embodiment, peripheral vectors similar to the query vector are generated, and the case example vectors exactly matching with the peripheral vectors are identified. Thus, the vector neighbor search with respect to the data table 20 is performed with a method involving a small amount of calculations. Hence, in an identical manner to the first embodiment, it becomes possible to reduce the amount of calculations in the vector neighbor search representing the majority of the amount of calculations in the conventional similarity search, and it becomes possible to shorten the execution period of the data search.

Moreover, in the second embodiment, the restrictions on the memory capacity are relaxed as compared to the first embodiment. Hence, it becomes possible to handle a relatively greater bit length and a relatively greater Hamming distance upper limit. With that, it becomes possible to avoid the risk of a decline in the search accuracy due to the restrictions on the bit length and the Hamming distance upper limit.

Third Embodiment

Given below is the explanation of the data management system according to the third embodiment. In the third embodiment, the LSH method used in vector mapping is different from the method implemented in the first embodiment. That is, in the first embodiment, the bitwise LSH is used in the mapping operation. However, in the third embodiment, product quantization LSH is used in the mapping operation.

The product quantization LSH converts the provided vector into an integer vector (a multivalued vector made of only integer elements). If the indexing method as explained in the first embodiment is implemented with respect to integer vectors, then the vector distance calculation during a search can be eliminated. Moreover, if the case example vector and the query vector to be handled are originally low-dimensional vectors in an identical manner to the first embodiment, then the mapping based on the product quantization LSH is not required, and the case example vector can be used without modification as a case example hash described later and the query vector can be used without modification as the query hash. Moreover, in this case, as peripheral hashes described later, the peripheral vectors generated based on the case example vector can be used.

The representative algorithm of the product quantization LSH is written in Reference Literature 4 mentioned below. As the product quantization LSH, various algorithms including the algorithm written in Reference Literature 4 have been proposed.

Reference Literature 4: Herve Jegou, Matthijs Douze and Cordelia Schmid, "Product quantization for nearest neighbor search", Pattern Analysis and Machine Intelligence, IEEE Transactions on 33.1 (2011): 117-128.

The representative sequence of hash generation based on the product quantization LSH is as follows.

(1) Firstly, from the space to which the provided case example vector group belongs, a plurality of (preferably mutually exclusive) partial spaces is obtained.

(2) In each partial space, the case example vector group is classified into a plurality of predetermined clusters.

(3) In each case example vector, an integer vector is generated in which the cluster numbers of each partial space are arranged. That represents the post-mapping vector.

(4) Using the distribution of each cluster, a distance model is generated for approximatively calculating, from the differences among the post-mapping vectors, the distances of the pre-mapping vectors.

The distance model generated at step (4) differs according to the algorithm. However, any distance model has the property that, when two integer vectors representing hashes are provided, the distance in the original vector space can be approximated. Moreover, in many algorithms, when the cluster numbers are adjacent to each other, the distribution areas of the clusters in the original vector spaces are also close to each other. The simplest form of the product quantization LSH algorithm is lattice vector quantization which is represented, without varying the number of dimensions, by the nearest neighbor points arranged in a lattice-like manner in the original vector space.

The data management system according to the third embodiment has an identical fundamental framework as the framework according to the first embodiment. However, in the third embodiment, the changes as compared to the first embodiment are as follows: the integer vectors are treated as hashes; and, instead of using the Hamming distance as the inter-vector distance, the distance that can be approximated using the distance model provided by the product quantization LSH is used. The following explanation is given about these changes.

Figures 23, 24:
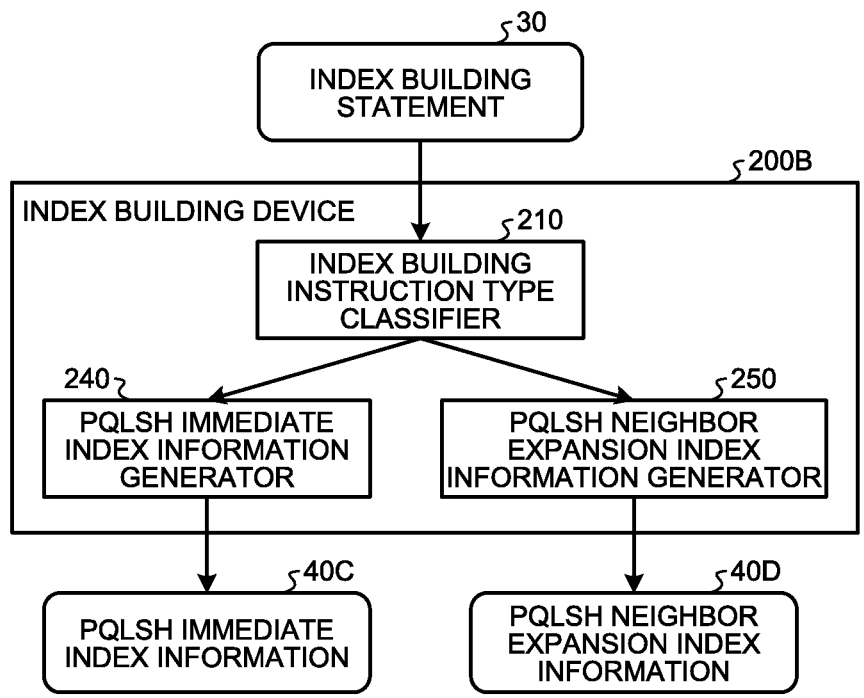
FIG. 23 is a block diagram illustrating an exemplary configuration of an index building device according to a third embodiment.
FIG. 24 is a diagram illustrating an example of a PQLSH neighbor expansion table.

FIG. 23 is a block diagram illustrating an exemplary configuration of an index building device 200B according to the third embodiment. As illustrated in FIG. 23, the index building device 200B according to the third embodiment includes a PQLSH immediate index information generator 240 instead of including the LSH immediate index information generator 220 (see FIG. 5) in the index building device 200 according to the first embodiment; and includes a PQLSH neighbor expansion index information generator 250 instead of including the LSH neighbor expansion index information generator 230 (see FIG. 5) in the index building device 200 according to the first embodiment.

The PQLSH immediate index information generator 240 receives the index building statement 30 from the index building instruction type classifier 210 and, according to the index building statement 30, generates PQLSH immediate index information 40C containing a PQLSH immediate table and a database index corresponding to a HashValue column in the PQLSH immediate table. The PQLSH immediate index information 40C generated by the PQLSH immediate index information generator 240 is identical to the LSH immediate index information 40A according to the first embodiment except for the fact that the values stored in the HashValue column of the PQLSH immediate table are not binary vectors but are integer vectors generated using the product quantization LSH algorithm. Hence, regarding the PQLSH immediate index information generator 240, the detailed explanation is not given herein.

The PQLSH neighbor expansion index information generator 250 receives the index building statement 30 from the index building instruction type classifier 210 and, according to the index building statement 30, generates PQLSH neighbor expansion index information 40D containing a PQLSH neighbor expansion table and containing a database composite index corresponding to the HashValue column and a Distance column in the PQLSH neighbor expansion table.

FIG. 24 is a diagram illustrating an example of the PQLSH neighbor expansion table. As illustrated in FIG. 24, the PQLSH neighbor expansion table represents table data made of the HashValue column (type: blob), the Distance column (type: real), and a DataRowID column (type: integer). In the example illustrated in FIG. 24, the hash of an integer vector having the length of 2 and taking an element value {0, 1, 2} is used, and the distance upper limit is set to 1.0. The values in the Distance column represent distances approximated using the distance model provided by the product quantization LSH algorithm. In this example, a distance model is used in which, when the first element of a hash undergoes a change by 1, the distance changes by 0.4; and, when the second element value undergoes a change by 1, the distance changes by 1.0.

The PQLSH neighbor expansion index information generator 250 retrieves feature vectors from the data table 20 specified in the index building statement 30 and, for each feature vector (each case example vector), generates a case example hash representing an integer vector using the LSH algorithm and the distance model specified in the index building statement 30. Then, for each generated case example hash, the PQLSH neighbor expansion index information generator 250 generates a group of peripheral hashes having the distances to be equal to or smaller than the distance specified in the index building statement 30. Subsequently, for example, the PQLSH neighbor expansion index information generator 250 registers, in the PQLSH neighbor expansion table, records including three sets of information, namely, a peripheral hash; the distance to the peripheral hash from the case example hash; and the row ID of such a record in the data table 20 to which belongs the case example vector representing the basis of the case example hash.

Meanwhile, the database composite index corresponding to the HashValue column and the Distance column of the PQLSH neighbor expansion table is almost same to the database composite index illustrated in FIG. 10 according to the first embodiment, and the only difference is that the branching along the values of the HammingDistance column as illustrated in FIG. 10 is substituted with the branching along the values of the Distance column.

Figure 25:
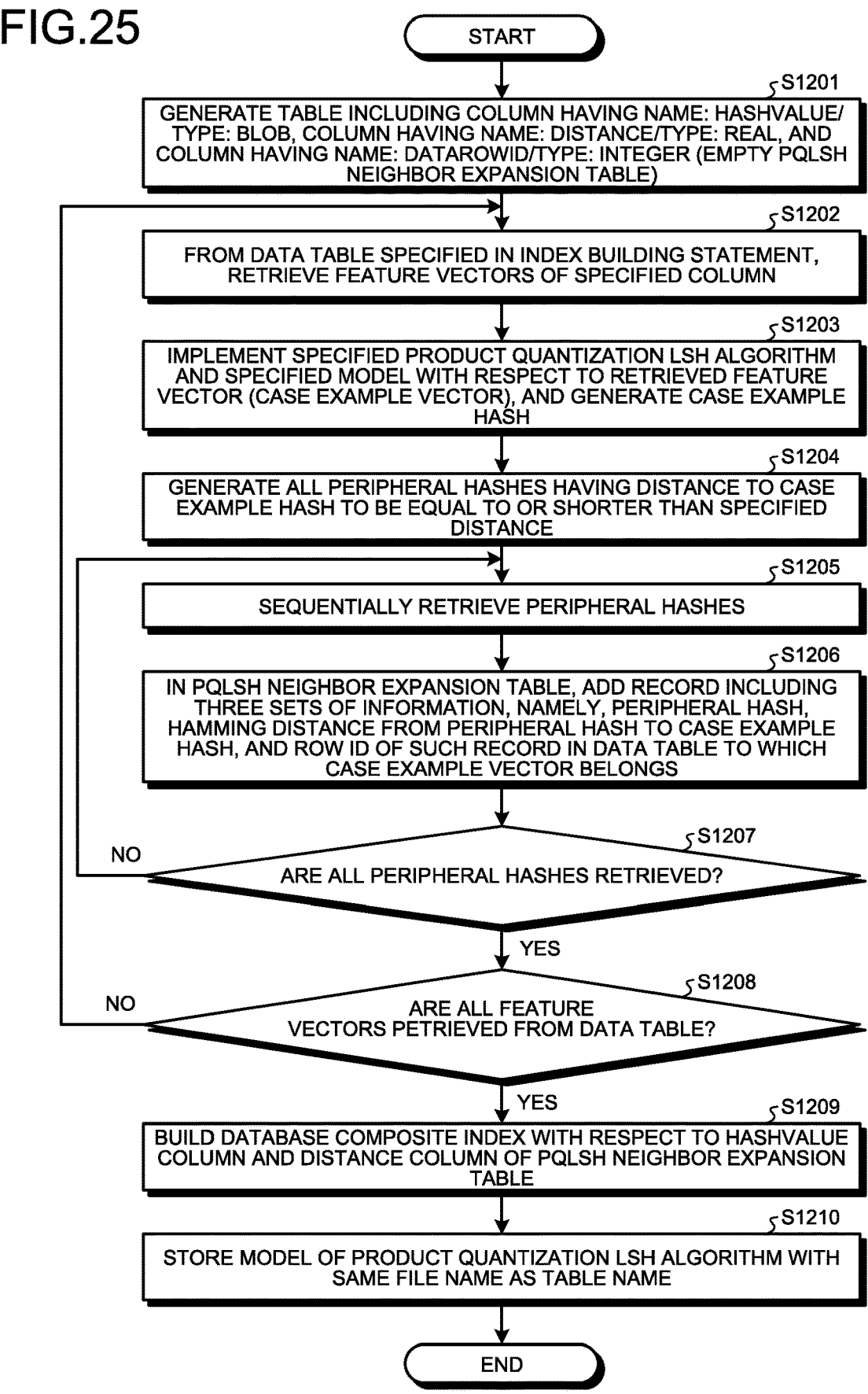
FIG. 25 is a flowchart for explaining an exemplary sequence of operations performed by a PQLSH neighbor expansion index information generator.

FIG. 25 is a flowchart for explaining an exemplary sequence of operations performed by the PQLSH neighbor expansion index information generator 250. The PQLSH neighbor expansion index information generator 250 receives the index building statement 30 from the index building instruction type classifier 210; performs, for example, the following operations from Step S1201 to Step S1210; and stores, in the database 400, the PQLSH neighbor expansion index information 40D containing a PQLSH neighbor expansion table and a database composite index.

Step S1201: The PQLSH neighbor expansion index information generator 250 generates, in the database 400, a table (an empty PQLSH neighbor expansion table) including a column having name: HashValue/type: blob, a column having name: Distance/type: real, and a column having name: DataRowID/type: integer. Moreover, the format of the table name is "AAAA_BBBB_CCCC_DDDD", where AAAA represents the table name of the target data table 20 for processing, BBBB represents the column name of the target column for processing, CCCC represents the algorithm name of the product quantization LSH algorithm, and DDDD represents the name of the model (the settings or the analysis result related to the algorithm). For example, a table name aTable_feat_PQ_confA is assigned to the generated table.

Step S1202: The PQLSH neighbor expansion index information generator 250 sequentially retrieves, from the data table 20 specified in the index building statement 30, the feature vectors of the column specified in the index building statement 30.

Step S1203: The PQLSH neighbor expansion index information generator 250 generates, with respect to the feature vector (the case example vector) retrieved at Step S1202, a case example hash using the product quantization LSH algorithm and the model specified in the index building statement 30.

Step S1204: The PQLSH neighbor expansion index information generator 250 generates all peripheral hashes having the distance from the case example hash, which is obtained at Step S1203, to be equal to or shorter than a specified distance. Herein, the distance between the case example hash representing the starting point and each peripheral hash is approximated using the model of the product quantization LSH algorithm.

Step S1205: The PQLSH neighbor expansion index information generator 250 sequentially retrieves the peripheral hashes obtained at Step S1204.

Step S1206: The PQLSH neighbor expansion index information generator 250 adds, in the PQLSH neighbor expansion table, a record including three sets of information, namely, the peripheral hash retrieved at Step S1205; the distance from the case example hash representing the starting point; and the row ID of such a record in the data table 20 to which belongs the case example vector representing the basis of the case example hash.

Step S1207: The PQLSH neighbor expansion index information generator 250 determines whether or not all peripheral hashes obtained at Step S1204 have been retrieved. If all peripheral hashes have not been retrieved, then the system control returns to Step S1205 and the PQLSH neighbor expansion index information generator 250 again performs the subsequent operations. When all peripheral hashes are retrieved, the system control proceeds to Step S1208.

Step S1208: The PQLSH neighbor expansion index information generator 250 determines whether or not all feature vectors have been retrieved from the target data table 20 for processing. If all feature vectors have not been retrieved, then the system control returns to Step S1202 and the PQLSH neighbor expansion index information generator 250 again performs the subsequent operations. When all feature vectors are retrieved, the system control proceeds to Step S1209.

Step S1209: The PQLSH neighbor expansion index information generator 250 builds a database composite index corresponding to the HashValue column and the Distance column of the PQLSH neighbor expansion table generated as a result of the operations described above, and stores the database composite index in the database 400.

Step S1210: The PQLSH neighbor expansion index information generator 250 stores, in the database 400, the model of the product quantization LSH algorithm, which was used in generating the case example hash, with the same file name (for example, aTable_feat_PQ_confA) as the table name.

Meanwhile, at Step S1204, the method for generating the peripheral hashes is similar to the method implemented in the first embodiment. However, in the third embodiment, not only it is necessary to decide which elements of the hash are to be changed, but it is also necessary to decide the magnitude of change of the values. For that, for example, a best-first search such as the Dijkstra method can be implemented.

Figure 26:
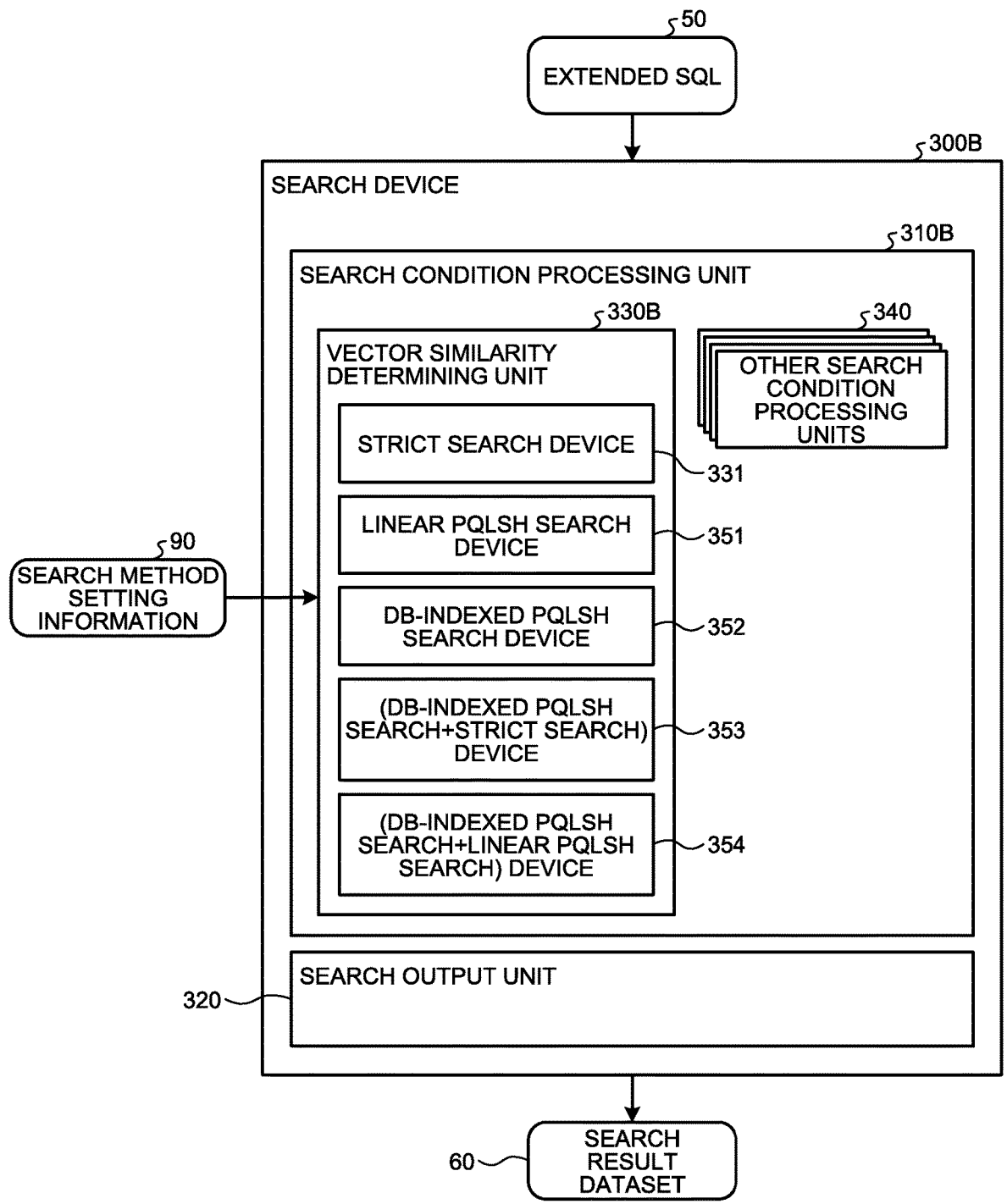
FIG. 26 is a block diagram illustrating an exemplary configuration of a search device according to the third embodiment.

FIG. 26 is a block diagram illustrating an exemplary configuration of a search device 300B according to the third embodiment. As compared to the first embodiment, the third embodiment differs in the way that a vector similarity determining unit 330B includes a linear PQLSH search device 351, a DB-indexed PQLSH search device 352, a (DB-indexed PQLSH search+strict search) device 353, and a (DB-indexed PQLSH search+linear PQLSH search) device 354 in place of the linear LSH search device 332, the DB-indexed LSH search device 333, the (DB-indexed LSH search+strict search) device 334, and the (DB-indexed LSH search+linear LSH search) device 335 as illustrated in FIG. 13.

The linear PQLSH search device 351 is identical to the linear LSH search device 332 according to the first embodiment except for the fact that the vectors under consideration are changed from binary vectors according to the first embodiment to integer vectors. Moreover, the (DB-indexed PQLSH search+strict search) device 353 and the (DB-indexed PQLSH search+linear PQLSH search) device 354 are identical to the (DB-indexed LSH search+strict search) device 334 and the (DB-indexed LSH search+linear LSH search) device 335, respectively, except for the fact that the search method in the first step of the two-step narrowing down is changed from the DB-indexed LSH search to the DB-indexed PQLSH search. Hence, the following explanation does not include the explanation about the linear PQLSH search device 351, the (DB-indexed PQLSH search+strict search) device 353, and the (DB-indexed PQLSH search+linear PQLSH search) device 354; and includes the explanation only about the DB-indexed PQLSH search device 352 that performs the DB-indexed PQLSH search. Meanwhile, it is also possible to implement the linear LSH search without modification from the first embodiment.

Figure 27:
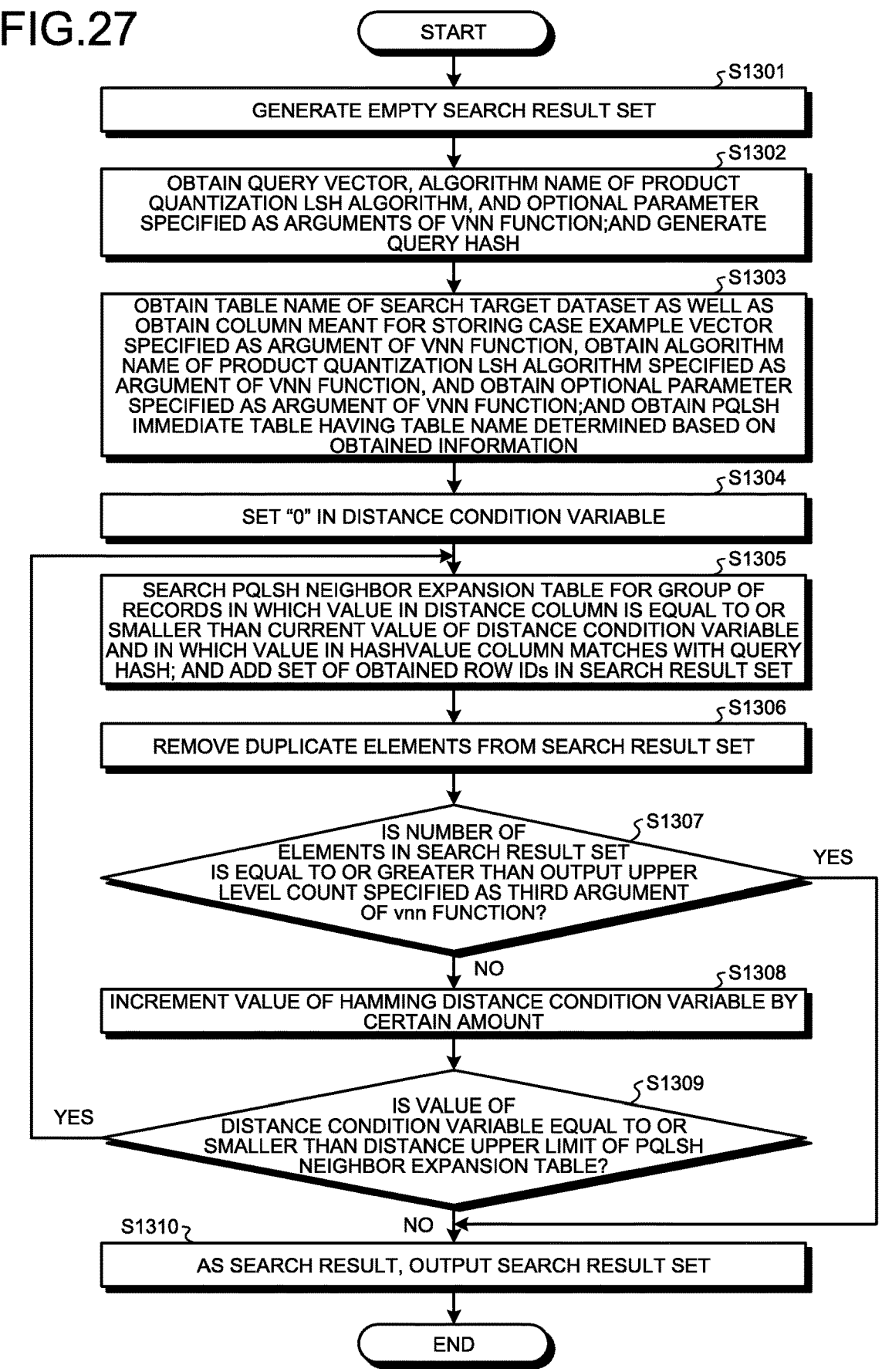
FIG. 27 is a flowchart for explaining an exemplary sequence of operations performed by a DB-indexed PQLSH search device.

FIG. 27 is a flowchart for explaining an exemplary sequence of operations performed by the DB-indexed PQLSH search device 352. The DB-indexed PQLSH search device 352 performs, for example, the following operations from Step S1301 to Step S1310, and outputs the search result 80.

Step S1301: The DB-indexed PQLSH search device 352 generates an empty search result set.

Step S1302: The DB-indexed PQLSH search device 352 obtains the query vector, the algorithm name of the product quantization LSH algorithm, and the optional parameter specified as the arguments of the vnn function; and generates a query hash.

Step S1303: The DB-indexed PQLSH search device 352 obtains the table name of the search target dataset 70 as well as obtains the column meant for storing the case example vector specified as an argument of the vnn function, obtains the algorithm name of the product quantization LSH algorithm specified as an argument of the vnn function, and obtains the optional parameter specified as an argument of the vnn function; and then obtains the PQLSH neighbor expansion table that has the table name determined based on them.

Step S1304: The DB-indexed PQLSH search device 352 sets "0" in a distance condition variable.

Step S1305: The DB-indexed PQLSH search device 352 searches the PQLSH neighbor expansion table, which is obtained at Step S1303, for the group of records in which the value in the Distance column is equal to or smaller than the current value of the distance condition variable and in which the value in the HashValue column matches with the query hash generated at Step S1302; and adds the set of obtained row IDs in the search result set.

Step S1306: The DB-indexed PQLSH search device 352 removes duplicate elements from the search result set.

Step S1307: The DB-indexed PQLSH search device 352 determines whether or not the number of elements in the search result set is equal to or greater than the output upper level count specified as the third argument of the vnn function. If the number of elements is not equal to or greater than the output upper level count, then the system control proceeds to Step S1308. Otherwise, the system control proceeds to Step S1310.

Step S1308: The DB-indexed PQLSH search device 352 increments the value of the distance condition variable by a certain amount.

Step S1309: The DB-indexed PQLSH search device 352 determines whether or not the value of the Hamming distance condition variable is equal to or smaller than the distance upper limit of the PQLSH neighbor expansion table. If the value of the distance condition variable is equal to or smaller than the distance upper limit, then the system control returns to Step S1305 and the DB-indexed PQLSH search device 352 again performs the subsequent operations. Otherwise, the system control proceeds to Step S1310.

Step S1310: The DB-indexed PQLSH search device 352 outputs the search result set as the search result 80. It marks the end of the operations.

As described above in detail with reference to specific examples, in the data management system according to the third embodiment, the index information 40 containing the PQLSH neighbor expansion index information 40D is generated as a result of preprocessing; and, at the time of performing a search, the index information 40 is used to identify the case example vectors corresponding to the peripheral vectors exactly matching with the query vector. Thus, a vector neighbor search with respect to the data table 20 is performed with a small amount of calculations. Hence, in an identical manner to the first embodiment, it becomes possible to reduce the amount of calculations in the vector neighbor search representing the majority of the amount of calculations in the conventional similarity search, and it becomes possible to shorten the execution period of the data search.

Supplementary Explanation

As an example, the data management system according to the embodiments can be implemented using a computer program that runs in an execution environment in which a commonly-used computer is used as the hardware. In this case, in the data management system according to the embodiments, the functional constituent elements (the data registration device 100, the index building device 200 (or the index building device 200B), and the search device 300 (or the search device 300A, or the search device 300B) are implemented using the cooperation between hardware and software (the computer program). Moreover, the database 400 is implemented using arbitrary memory resources accessible by the computer program.

Figure 28:
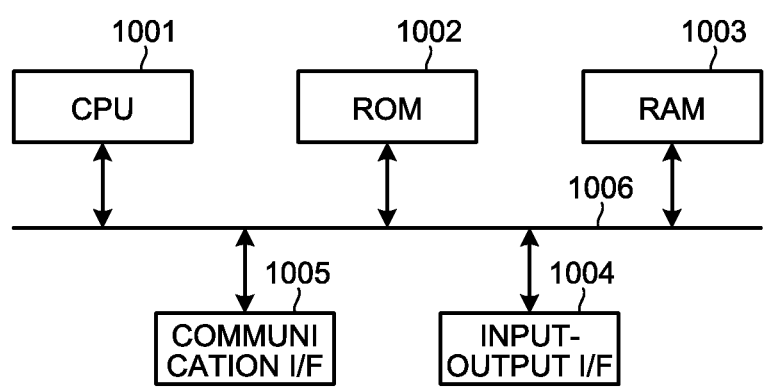
FIG. 28 is a block diagram illustrating an exemplary hardware configuration of the data management system.

FIG. 28 is a block diagram illustrating an exemplary hardware configuration of the data management system. As illustrated in FIG. 28, the data management system can have a hardware configuration of a normal computer that includes a processor circuit such as a central processing unit (CPU) 1001; memory devices such as a read only memory (ROM) 1002 and a random access memory (RAM) 1003; an input-output interface (I/F) 1004 to which a display panel and various operation devices are connected; a communication I/F 1005 that establishes communication with a network and performs communication; and a bus 1006 that connects the constituent elements to each other.

The computer program executed in the abovementioned hardware configuration is, for example, recorded as an installable file or an executable file in a computer-readable recording medium such as a compact disk read only memory (CD-ROM), a flexible disk (FD), a compact disk recordable (CD-R), or a digital versatile disc (DVD); and is provided as a computer program product. Alternatively, the computer program executed in the abovementioned hardware configuration can be stored and provided in a downloadable manner in a computer connected to a network such as the Internet. Still alternatively, the computer program executed in the abovementioned hardware configuration can be provided or distributed over a network such as the Internet. Still alternatively, the computer program executed in the abovementioned hardware configuration can be stored in advance in the ROM 1002.

The computer program executed in the abovementioned hardware configuration contains modules of the functional constituent elements of the data management system according to the embodiments. For example, the CPU 1001 (the processor circuit) reads the computer program from the recording medium and executes it so that the constituent elements get loaded and generated in the RAM 1003 (a main memory). Meanwhile, the functional constituent elements and the database 400 of the data management system according to the embodiments can be implemented across a plurality of computers. Alternatively, some or all of the functional constituting elements can be implemented using dedicated hardware such as an application specific integrated circuit (ASIC) or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data management system comprising:
   circuitry configured to:
   perform index building by
      generating a peripheral vector similar to a case example vector representing a feature vector of data to be stored, and
      building index information of enabling identification of the case example vector corresponding to the generated peripheral vector; and
   performing searching in response to a search request in which a query vector representing an arbitrary feature vector is specified,
      by referring to the index information,
      by identifying the case example vector corresponding to the peripheral vector that exactly matches with the query vector, and
      by outputting a search result based on the identified case example vector, wherein
   the circuitry performs the index building by building the index information that contains
      a table which, as column elements, at least has a first column for storing the peripheral vector and a second column for storing information related to the case example vector corresponding to the peripheral vector, and
      an index with respect to the first column in the table,
   the circuitry performs the searching by
      using the index,
      obtaining such a record in the table which corresponds to the peripheral vector exactly matching with the query vector, and
      identifying the case example vector based on information stored in the second column of the obtained record,
   the circuitry performs the index building by building the index information that contains
      a first table which, as column elements, has a first column for storing the peripheral vector and a second column for storing degree of similarity of the peripheral vector with respect to the case example vector,
      a second table which, as column elements, has a first column for storing a row ID of a record of the first table and a second column for storing information related to the case example vector corresponding to the peripheral vector of the record, and
      a composite index with respect to the first column and the second column in the first table, and
   the circuitry performs the searching by
      using the composite index,
      obtaining, as a link, a row ID of such a record in the first table which corresponds to the peripheral vector exactly matching with the query vector and having the degree of similarity satisfying a condition, and
      identifying the case example vector based on information stored in the second column of such a record in the second table in which the obtained row ID is stored.

2. The data management system according to claim 1, wherein, as data structure of the table, an associative array or a continuous memory arrangement array is used in which the peripheral vector stored in the first column is treated as a key and information stored in the second column is treated as a value.

3. The data management system according to claim 1, wherein
   the circuitry performs the index building by building the index information that contains
      the table which, as column elements, has, in addition to having the first column and the second column, a third column for storing degree of similarity of the peripheral vector with respect to the case example vector, and
      a composite index with respect to the first column and the third column in the table, and
   the circuitry performs the searching by
      using the composite index,
      obtaining such a record in the table which corresponds to the peripheral vector exactly matching with the query vector and having the degree of similarity satisfying a condition, and
      identifying the case example vector based on information stored in the second column of the obtained record.

4. The data management system according to claim 3, wherein, as data structure of the table, an associative array or a continuous memory arrangement array is used in which the peripheral vector stored in the first column and the degree of similarity stored in the third column are treated as keys and information stored in the second column are treated as a value.

5. The data management system according to claim 1, wherein
   the circuitry performs the index building by building, as the index information, an index meant for searching for information related to the case example vector corresponding to the peripheral vector according to a value of the peripheral vector exactly matching with the query vector, and
   the circuitry performs the searching by using the index and identifying the case example vector corresponding to the peripheral vector that exactly matches with the query vector.

6. The data management system according to claim 1, wherein
   the circuitry performs the index building by building, as the index information, a composite index meant for searching for information related to the case example vector corresponding to the peripheral vector according to a value of the peripheral vector exactly matching with the query vector and according to a degree of similarity of the peripheral vector with respect to the case example vector, and
   the circuitry performs the searching by using the composite index and identifying the case example vector corresponding to the peripheral vector that exactly matches with the query vector and that has the degree of similarity satisfying a condition.

7. The data management system according to claim 1, wherein, when the search request includes specification of output count, the circuitry performs the searching by
   performing, while varying a condition of degree of similarity of the peripheral vector with respect to the case example vector in a phased manner from strict side, an operation of identifying the case example vector corresponding to the peripheral vector exactly matching with the query vector in a repeated manner until total number of the identified case example vector becomes equal to or greater than the output count, stopping the operation when total number of the identified case example vector becomes equal to or greater than the output count, and outputting a search result equal to a count close to the output count based on the identified case example vectors.

8. The data management system according to claim 1, wherein the circuitry performs the index building by generating a contracted peripheral vector that is similar to a contracted case example vector formed by mapping the case example vector in a contracted vector space, and building the index information of enabling identification of the case example vector corresponding to the contracted peripheral vector that has been generated, and the circuitry performs the searching by identifying the case example vector corresponding to the contracted peripheral vector that exactly matches with a contracted query vector formed by mapping the query vector in a contracted vector space which is common with the index building.

9. The data management system according to claim 8, wherein locality-sensitive hashing (LSH) technology is used in mapping of the case example vector to the contracted case example vector and in mapping of the query vector to the contracted query vector.

10. The data management system according to claim 9, wherein, as the LSH technology, bitwise LSH is used in which the case example vector is converted into the contracted case example vector representing a binary vector with each dimension taking only binary value and in which the query vector is converted into the contracted query vector representing a binary vector with each dimension taking only binary value.

11. The data management system according to claim 10, wherein the circuitry performs the index building by generating the contracted peripheral vector representing a binary vector and building the index information in which the generated contracted peripheral vector is stored as an integer symbolizing binary, and the circuitry performs the searching by using the contracted query vector, which is a binary vector, as an integer symbolizing binary and identifying the case example vector that corresponds to the contracted peripheral vector exactly matching with the contracted query vector.

12. The data management system according to claim 9, wherein, as the LSH technology, product quantization LSH is used in which the case example vector is converted into the contracted case example vector representing an integer vector and in which the query vector is converted into the contracted query vector representing an integer vector.

13. The data management system according to claim 1, wherein, from among a plurality of search methods including a search method in which the index information is used and a search method in which a linear search is performed using an original feature vector or using a feature vector mapped in a contracted vector space, the circuitry performs the searching by searching for the case example vector by implementing a search method selected according to number of records in the data table.

14. The data management system according to claim 1, wherein the circuitry performs a search for the case example vector by combining, in multiple steps, arbitrary search methods from among a plurality of search methods including a search method in which the index information is used and a search method in which a linear search is performed using an original feature vector or using a feature vector mapped in a contracted vector space.

15. A data management method implemented in a data management system, comprising:

performing index building by generating a peripheral vector similar to a case example vector representing a feature vector of data to be stored, and building index information of enabling identification of the case example vector corresponding to the generated peripheral vector; and performing searching by referring to the index information in response to a search request in which a query vector representing an arbitrary feature vector is specified, identifying the case example vector corresponding to the peripheral vector that exactly matches with the query vector, and outputting a search result based on the identified case example vector, wherein the index building is performed by building the index information that contains a table which, as column elements, at least has a first column for storing the peripheral vector and a second column for storing information related to the case example vector corresponding to the peripheral vector, and an index with respect to the first column in the table, the searching is performed by using the index, obtaining such a record in the table which corresponds to the peripheral vector exactly matching with the query vector, and identifying the case example vector based on information stored in the second column of the obtained record, the index building is performed by building the index information that contains a first table which, as column elements, has a first column for storing the peripheral vector and a second column for storing degree of similarity of the peripheral vector with respect to the case example vector, a second table which, as column elements, has a first column for storing a row ID of a record of the first table and a second column for storing information related to the case example vector corresponding to the peripheral vector of the record, and a composite index with respect to the first column and the second column in the first table, and the searching is performed by using the composite index, obtaining, as a link, a row ID of such a record in the first table which corresponds to the peripheral vector exactly matching with the query vector and having the degree of similarity satisfying a condition, and identifying the case example vector based on information stored in the second column of such a record in the second table in which the obtained row ID is stored.

16. A computer program product having a non-transitory computer readable medium including programmed instructions, wherein the instructions, when executed by a computer, cause the computer to implement:

performing index building by generating a peripheral vector similar to a case example vector representing a feature vector of data to be stored, and building index information of enabling identification of the case example vector corresponding to the generated peripheral vector; and performing searching by referring to the index information in response to a search request in which a query vector representing an arbitrary feature vector is specified, identifying the case example vector corresponding to the peripheral vector that exactly matches with the query vector, and outputting a search result based on the identified case example vector, wherein the index building is performed by building the index information that contains a table which, as column elements, at least has a first column for storing the peripheral vector and a second column for storing information related to the case example vector corresponding to the peripheral vector, and an index with respect to the first column in the table, the searching is performed by using the index, obtaining such a record in the table which corresponds to the peripheral vector exactly matching with the query vector, and identifying the case example vector based on information stored in the second column of the obtained record, the index building is performed by building the index information that contains a first table which, as column elements, has a first column for storing the peripheral vector and a second column for storing degree of similarity of the peripheral vector with respect to the case example vector, a second table which, as column elements, has a first column for storing a row ID of a record of the first table and a second column for storing information related to the case example vector corresponding to the peripheral vector of the record, and a composite index with respect to the first column and the second column in the first table, and the searching is performed by using the composite index, obtaining, as a link, a row ID of such a record in the first table which corresponds to the peripheral vector exactly matching with the query vector and having the degree of similarity satisfying a condition, and identifying the case example vector based on information stored in the second column of such a record in the second table in which the obtained row ID is stored.

* * * * *